US012653179B2

(12) United States Patent
Stokes et al.

(10) Patent No.: US 12,653,179 B2
(45) Date of Patent: Jun. 16, 2026

(54) WATERFOWL DECOY FLAG

(71) Applicant: Dive Bomb Industries, LLC, Maryland Heights, MO (US)

(72) Inventors: Cody E. Stokes, St. Louis, MO (US); Thomas J. Dryer, Foley, MO (US)

(73) Assignee: Dive Bomb Industries, LLC, Hazelwood, MO (US)

( * ) Notice: Subject to any disclaimer, the term of this patent is extended or adjusted under 35 U.S.C. 154(b) by 200 days.

(21) Appl. No.: 18/414,118

(22) Filed: Jan. 16, 2024

(65) Prior Publication Data

US 2024/0237632 A1 Jul. 18, 2024

Related U.S. Application Data

(60) Provisional application No. 63/479,837, filed on Jan. 13, 2023.

(51) Int. Cl.
| | |
|---|---|
| *A01M 31/06* | (2006.01) |
| *G09F 15/00* | (2006.01) |
| *G09F 17/00* | (2006.01) |

(52) U.S. Cl.
CPC ......... *A01M 31/06* (2013.01); *G09F 15/0068* (2013.01); *G09F 17/00* (2013.01)

(58) Field of Classification Search
CPC ....... A63H 3/20; A63H 27/008; A63J 19/006; G09F 2015/0093; G09F 15/0062; G09F 15/0068; A01M 31/06
USPC ......... 446/330, 363, 365, 366, 359, 35, 490; 135/30; 40/218, 603, 604, 610; 116/173–175; 43/2, 3
See application file for complete search history.

(56) References Cited

U.S. PATENT DOCUMENTS

| | | | | |
|---|---|---|---|---|
| 2,478,585 A * | 8/1949 | Kouba | ................... | A01M 31/06 43/3 |
| 6,216,382 B1 * | 4/2001 | Lindaman | ............. | A01M 31/06 248/533 |
| 6,385,895 B1 * | 5/2002 | Scaries | ................. | A01M 31/06 43/2 |
| 7,131,230 B1 * | 11/2006 | Gilsdorf | ................ | A01M 31/06 43/2 |
| 10,993,432 B2 * | 5/2021 | Latschaw | ............. | A01M 31/06 |
| 11,246,307 B2 * | 2/2022 | Noe | ...................... | A01M 31/06 |
| 2002/0173217 A1 * | 11/2002 | Kinkade | ............. | A63H 27/008 446/35 |
| 2007/0062093 A1 * | 3/2007 | Hess | ..................... | A01M 31/06 43/2 |
| 2014/0245653 A1 * | 9/2014 | Foster | ................... | A01M 31/06 43/3 |
| 2015/0052797 A1 * | 2/2015 | Parsons | ................. | A01M 31/06 43/2 |
| 2017/0042138 A1 * | 2/2017 | Oshgan | ................. | A01M 31/06 |

* cited by examiner

*Primary Examiner* — Robert Canfield
(74) *Attorney, Agent, or Firm* — Stinson LLP

(57) ABSTRACT

A waterfowl decoy flag and associated components and methods. The waterfowl decoy flag may include a wing support, first and second wings, and a wing driver configured to drive the wings between stowed and deployed orientations. The waterfowl decoy flag may include a frame including a wing support and left and right wing arms supported by the wing support. A webbing mounted on the frame includes left and right wing webbing portions associated with the left and right wing arms to form the left and right wings.

56 Claims, 22 Drawing Sheets

WATERFOWL DECOY FLAG

CROSS-REFERENCE TO RELATED APPLICATION

The present application claims priority to U.S. Provisional Patent Application No. 63/479,837, filed Jan. 13, 2023, the entirety of which is hereby incorporated by reference.

FIELD

The present disclosure generally relates to waterfowl hunting gear, and more particularly to decoys for waterfowl hunting.

BACKGROUND

Various types of waterfowl decoys are used in hunting waterfowl. One type of waterfowl decoy is a goose flag. Hunters move such flags to imitate movements of geese to attract geese to a hunting setup.

SUMMARY

In one aspect, a waterfowl decoy flag comprises a wing arm support, a first wing arm, and a second wing arm. The flag further comprises a first wing webbing portion associated with the first wing arm, and a second wing webbing portion associated with the second wing arm. The first and second wing arms are selectively configurable with respect to the wing arm support in a stowed configuration and in a deployed configuration. The first and second sing arms are configured to, when in the deployed configuration: be supported by the wing arm support, be in respective deployed orientations with respect to the wing arm support, and support the respective first and second wing webbing portions to form first and second wings. The first and second wing arms, when in the stowed configuration, are in respective stowed orientations with respect to the wing arm support different from the deployed orientations.

In another aspect, a waterfowl decoy flag comprises a wing arm support, a first wing arm, a second wing arm, a first wing webbing portion associated with the first wing arm, and a second wing webbing portion associated with the second wing arm. The first and second wing arms are configured to be supported by the wing arm support in a deployed configuration in which the first and second wing arms are in deployed orientations with respect to the wing arm support and support the respective first and second wing webbing portions to form first and second wings. The first and second wing arms are moveable with respect to the wing arm support to move the first and second wing arms out of the deployed orientations. At least one of the first or second wing webbing portions is configured to be tensioned in the deployed configuration to apply a retaining force to at least one of the first and second wing arms to retain said at least one of the first and second wing arms in the deployed orientation.

In yet another aspect, a waterfowl decoy flag comprises a wing support, a first wing moveably coupled to the wing support, and a second wing moveably coupled to the wing support. A wing driver is operatively coupled to the first and second wings. The wing driver includes a wing actuator moveable with respect to the wing support and configured to move the first and second wings between stowed and deployed orientations with respect to the wing support.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
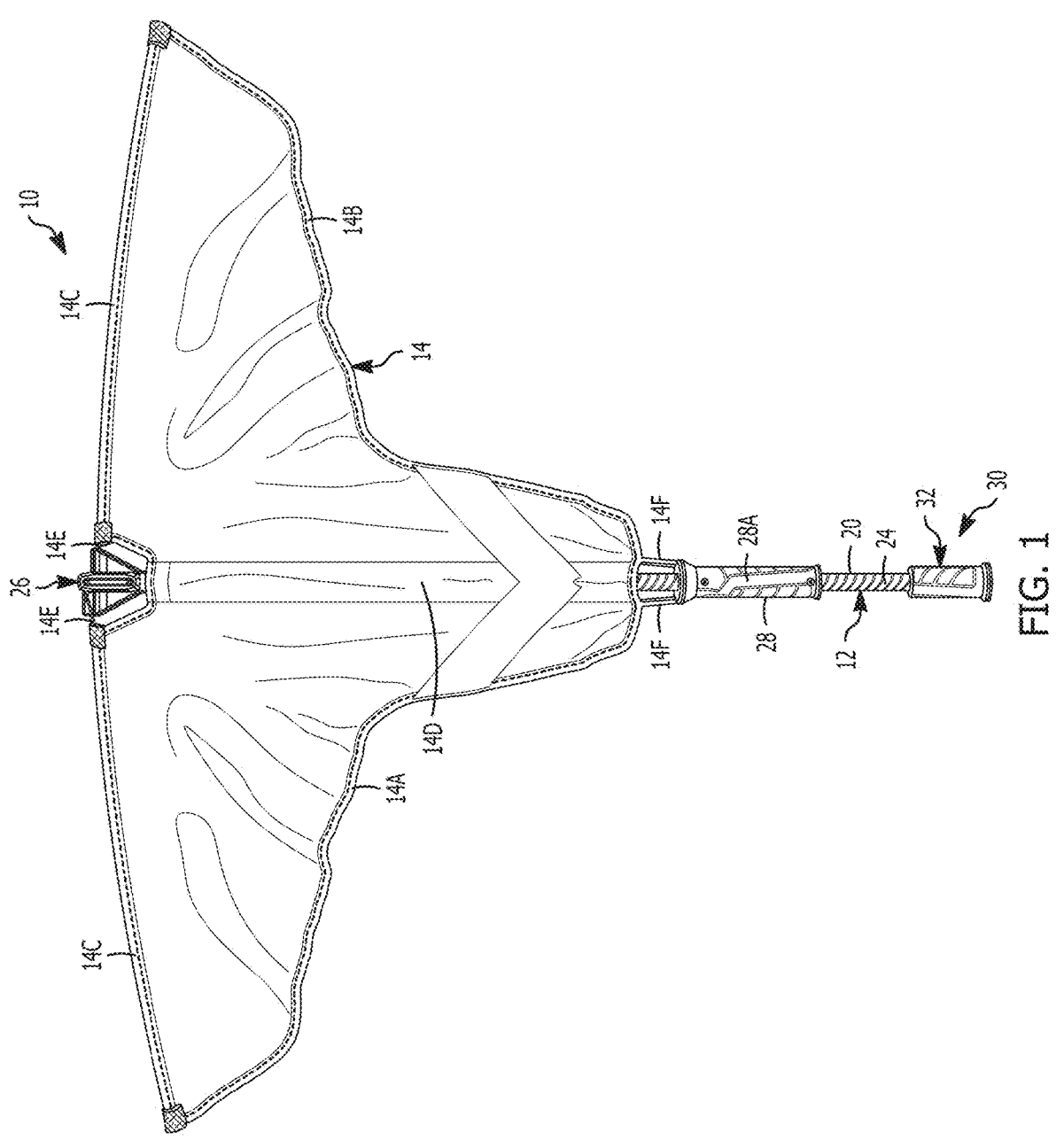
FIG. 1 is a front elevation of a waterfowl flag of the present disclosure shown in a deployed configuration.
Figure 2:
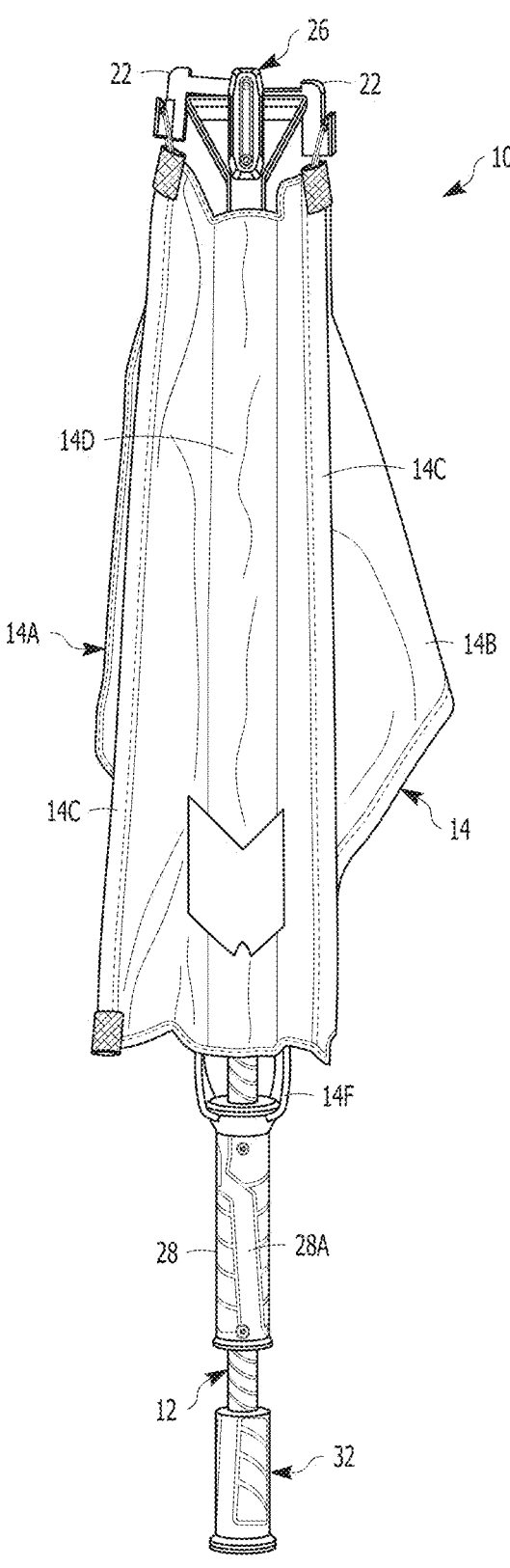
FIG. 2 is a front elevation of the waterfowl flag shown in a stowed configuration.

The present disclosure is directed to a waterfowl flag for decoying waterfowl. In the illustrated embodiment, the waterfowl flag 10 is configured to imitate a Canada goose. It will be appreciated that the flag can be used to attract attention of geese or other waterfowl from far distances. Desirably, the flag 10 can be used to imitate movements of waterfowl to attract waterfowl to a hunting setup. For example, a hunter may hold the flag 10 and shake or otherwise move the flag to resemble a goose landing. After waterfowl are committed to approaching the hunting setup, desirably the flag 10 is hidden to not attract undesirable attention or scare the waterfowl away. As described in further detail below, the wings of the waterfowl flag of the present disclosure are configured to be stowed (e.g., FIG. 2) and deployed (e.g., FIG. 1) in rapid fashion to permit a user to selectively extend the wings when they are needed and to retract the wings when the wings are not needed. When the wings are stowed, the wings are easier to hide from approaching waterfowl and are easier to store in a blind or other enclosure where hunters might not have ample space.

Referring to FIGS. 1-4, the waterfowl flag 10 includes a frame 12 and webbing 14 mounted on the frame. The frame 12 provides skeletal support for the webbing 14. The frame 12 and webbing 14 together form wings that can be selectively deployed and stowed. Although the illustrated configuration is intended to imitate a Canada goose, other configurations (e.g., other geese, such as snow geese, or other waterfowl) can be used without departing from the scope of the present disclosure.

The webbing 14 includes a fabric body having a left wing webbing portion 14A and a right wing webbing portion 14B. The webbing includes sleeves 14C along the top of the left and right wing portions and a sleeve 14D between the left and right wing portions, each of which receive respective portions of the frame 12 to connect the webbing to the frame. In the illustrated embodiment, the webbing 14 comprises fabric sewn to provide the sleeves 14C, 14D. Hems are provided around edge margins of the fabric. The webbing 14 also includes two upper resiliently extendable ties 14E and two lower resiliently extendable ties 14F. In the illustrated embodiment, the ties 14E, 14F comprise elastic bands looped and sewn to the fabric. The ties connect the webbing 14 to the frame 12 and serve other functions as explained in more detail below. Other configurations of webbing can be used without departing from the scope of the present disclosure.

Figure 3:
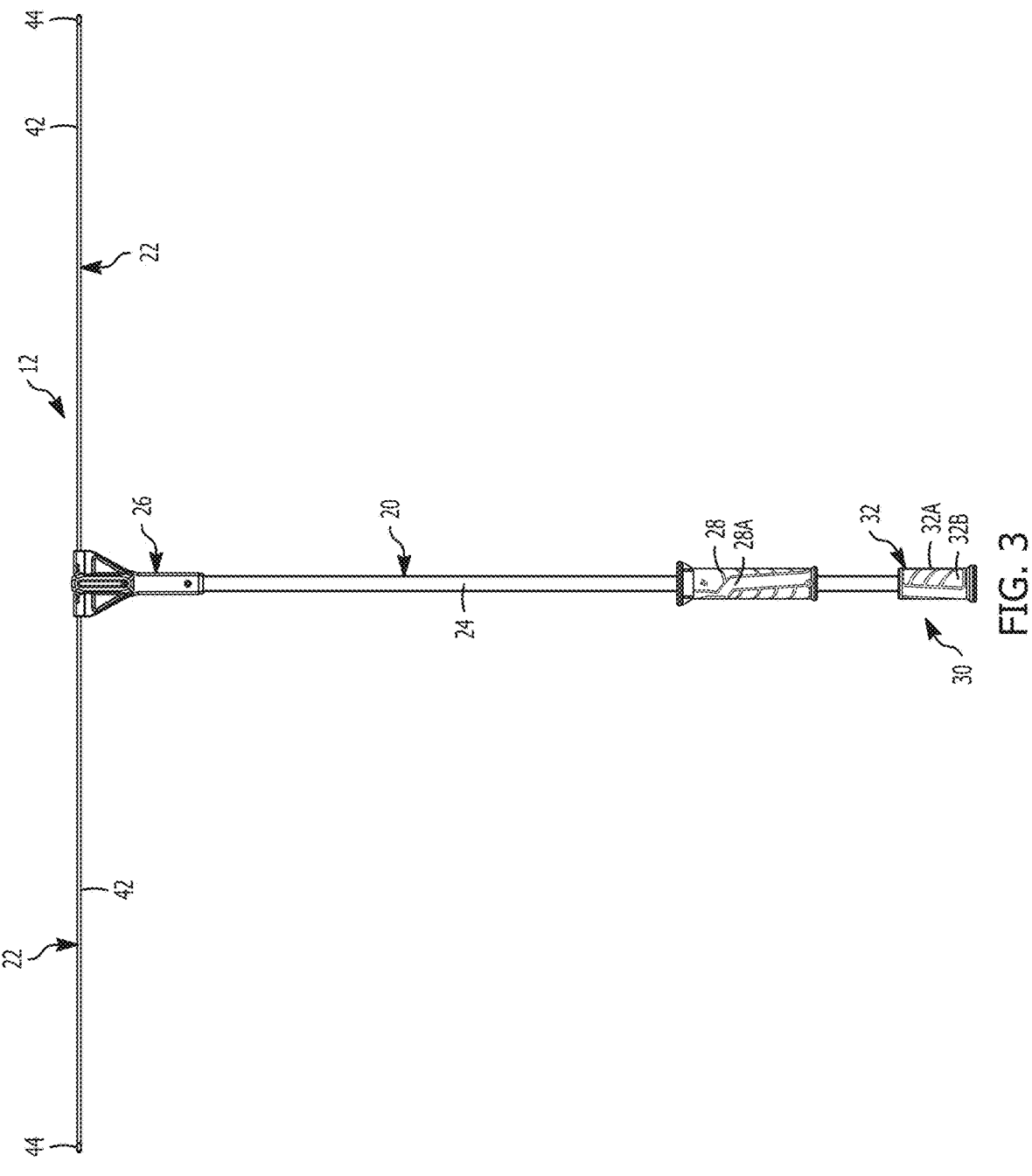
FIG. 3 is a front elevation of a frame of the waterfowl flag shown in the deployed configuration.
Figure 4:
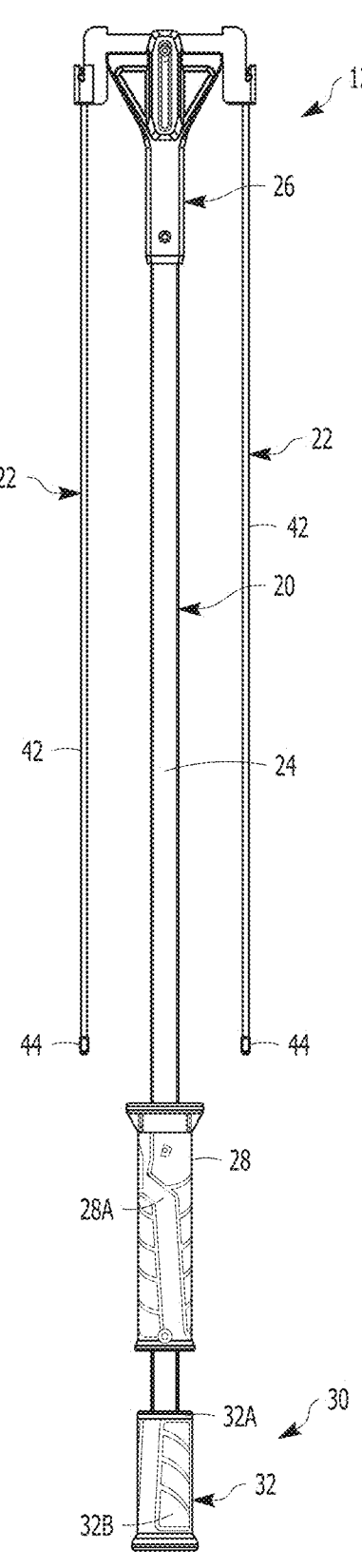
FIG. 4 is a front elevation of the frame of the waterfowl flag shown in the stowed configuration.

Referring to FIGS. 3 and 4, the frame 12 includes a wing support 20 and two wing arms 22. The wing support 20 acts as the spine of the flag. The wing arms 22 are moveable with respect to the wing support 20 between deployed and stowed orientations to change the configuration of the frame between the deployed configuration (e.g., FIG. 3) and stowed configuration (e.g., FIG. 4). The wing support 20 comprises a shaft 24 having a head (distal) end portion and a handle (proximal) end portion. The wing support 20 includes a head 26 connected to the head end portion of the shaft 24, and includes a handle 28 having a grip 28A at the handle end portion. In the illustrated embodiment, the shaft 24 has a square cross-sectional shape and is made of fiberglass, but other shapes and materials can be used without departing from the scope of the present disclosure.

Figure 5:
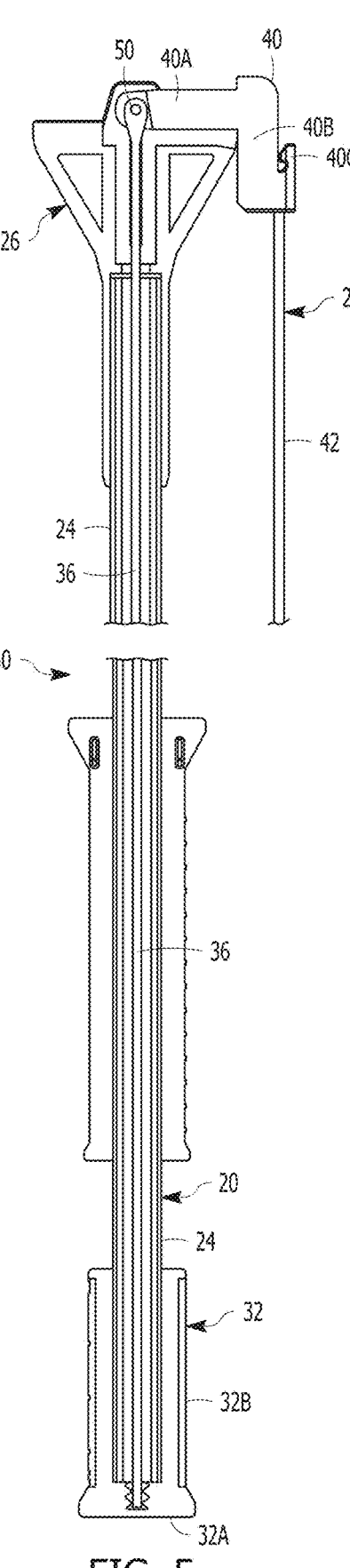
FIG. 5 is a fragmentary section of the frame shown in the stowed configuration.

Referring to FIGS. 3-5, the waterfowl flag comprises a wing driver 30 configured to drive movement of the wings between the stowed and deployed orientations. In the illustrated embodiment, the wing driver 30 includes a wing actuator 32 located at the handle end portion of the shaft 24. More specifically, the wing actuator 32 is provided in the form of a handle 32A having a grip 32B at the proximal end of the shaft 24. The wing actuator 32 has a bore in which the shaft 24 extends, and the wing actuator is slideable as a slider along the shaft. As shown by comparison of FIGS. 3 and 4, the wing actuator 32 is moveable upward and downward along the shaft 24 to change the wing arms between the stowed and deployed orientations. The wing driver 30 further includes a rod 36 (broadly, "linkage") extending inside the shaft 24 upward from the wing actuator 32 to the head 26. The proximal end of the rod 36 is connected (e.g., threaded) to the wing actuator 32. The arrangement is such that movement of the wing actuator 32 upward moves the rod 36 upward to change the wings to the stowed configuration, and movement of the wing actuator downward moves the rod downward to change the wings to the deployed configuration. The user may grasp the distal handle grip 28A and the wing actuator handle grip 32B with two different hands, and apply force to the wing actuator handle grip to move it up/down with respect to the distal handle grip. Such movement causes movement of a distal end of the rod 36, which changes the wings between stowed and deployed orientations, as explained in further detail below.

Figure 7:
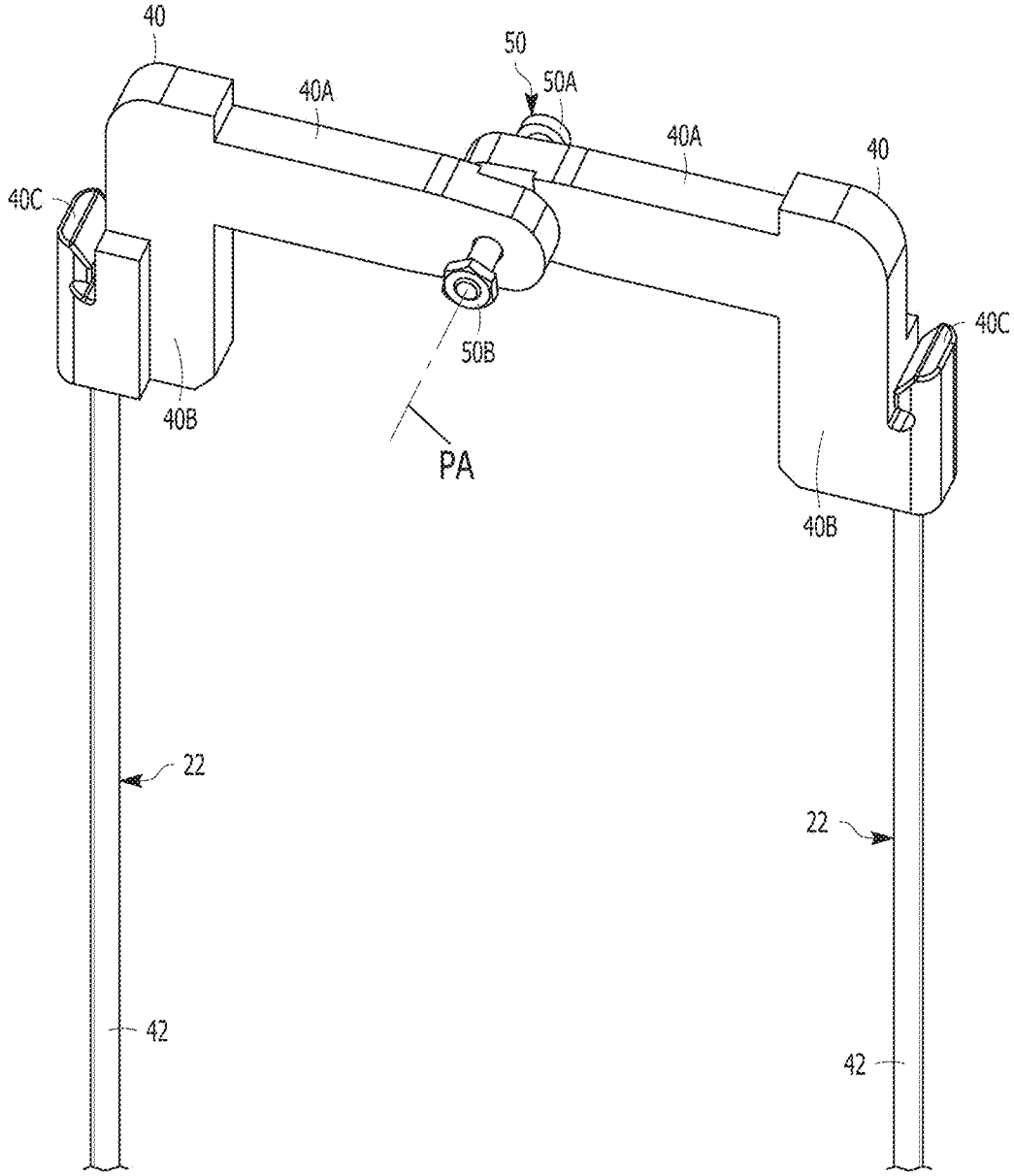
FIG. 7 is a fragmentary front perspective of a wing arm assembly of the frame.

Referring to FIGS. 7 and 4, the wing arms 22 each include a wing bracket 40 and a wing rod 42. Desirably, the wing rods 42 are flexible and made of fiberglass. The flexibility of the wing rods allows the flag 10 to imitate flapping wings of a landing waterfowl. It has been found that the wings rods 42 having tapering thickness (lesser width at their distal ends than the proximal ends connected to the brackets) provide substantial bendability without breakage, greatly increasing the durability of the decoy flag compared to prior art constructions. Wing rod tip covers 44 are provided on the tips of the wing rods 42 to further enhance durability. The brackets 40 each have an L-shaped body including a tongue 40A and a rod connector 40B extending transversely with respect to the tongue. The proximal ends of the rods 42 may be molded in in the rod connectors 40B. The brackets further include webbing connectors 40C (shown as clips or hooks) discussed in further detail below with respect to FIG. 17. The tongues 40A are pivotally connected to each other by a fastener 50 (e.g., bolt 50A and nut 50B) creating a pin connection having a pivot axis PA. The arms 22 are pivotable with respect to each other about the pivot axis PA to change the wings between the stowed and deployed orientations. The distal end of the rod 36 (e.g., FIGS. 8, 12) is located between the tongues 40A of the brackets 40 and is pivotally connected to both brackets via the fastener 50 being received through an eyelet of the rod. It will be appreciated that because of the L shape of the brackets 40 the pivot connection of the two tongues 40A is offset from the longitudinal axes of the wing rods.

Figure 6:
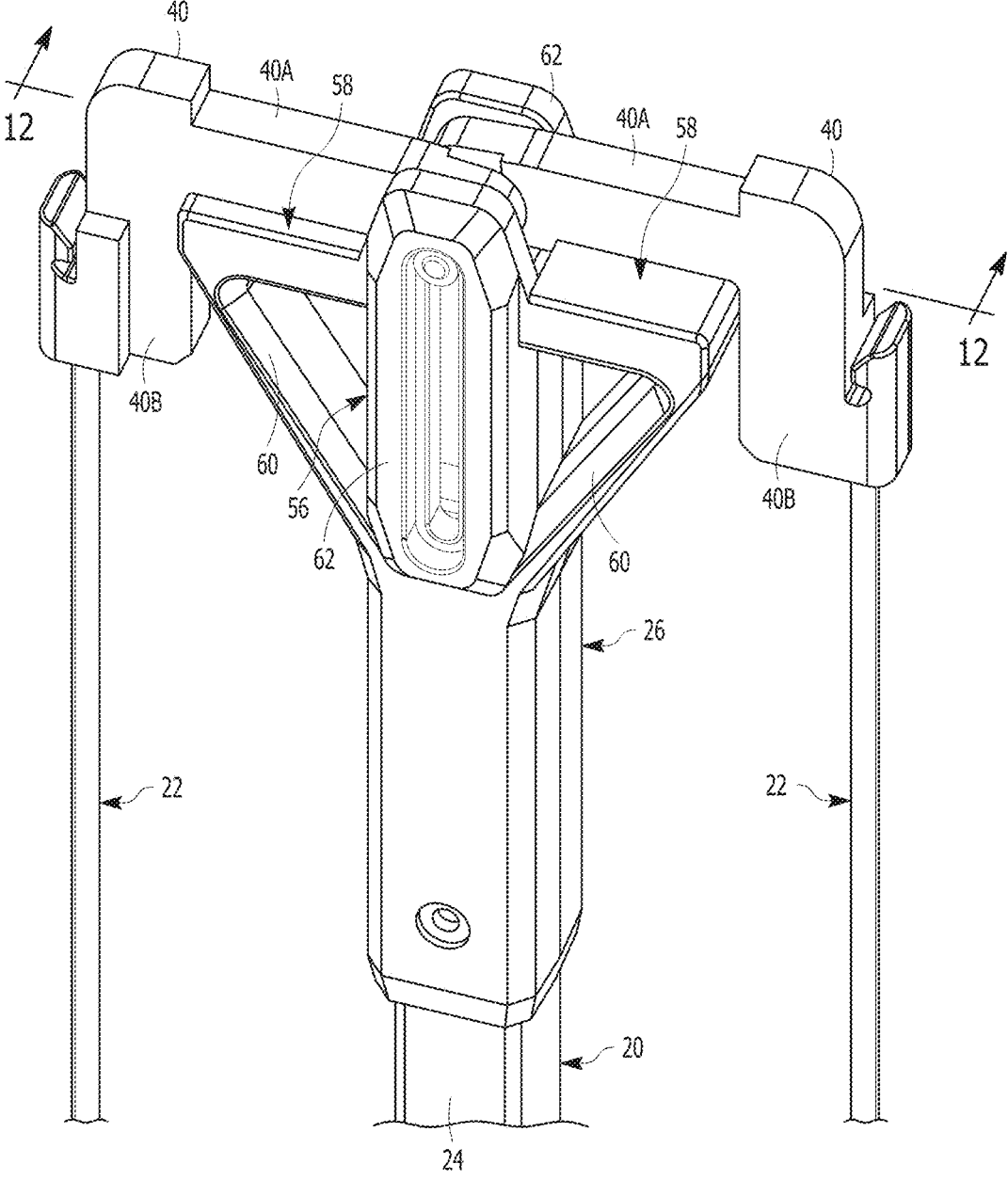
FIG. 6 is a fragmentary front perspective of a head region of the frame in the stowed configuration.
Figure 8:
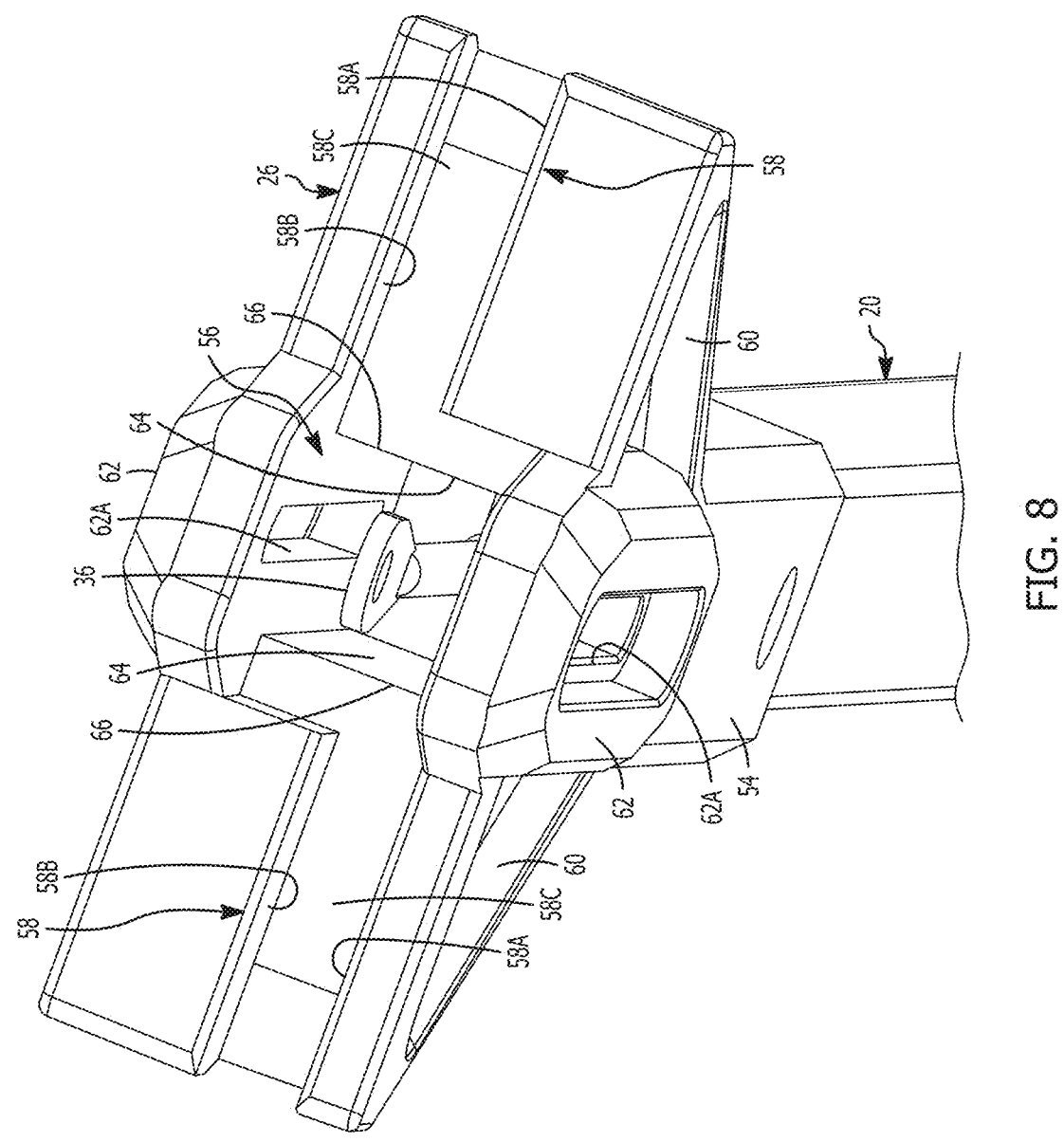
FIG. 8 is a fragmentary top perspective of a head of a wing arm support of the frame.

As shown in FIG. 8, the head 26 of the wing support 20 includes a base portion 54 including an opening in which the distal end of the shaft 24 is received to mount the head on the shaft. The head 26 further includes a receiver 56 (broadly, "arm receiver" or "tongue receiver"), left and right braces 58, and associated struts 60 extending from the base portion to the braces to support the braces. The head 26 includes front and rear guides 62 forming tracks 62A along which the fastener 50 (e.g., a head and a nut thereof) is moveable upward and downward. The fastener 50 is moveable upward along the tracks 62A to tops of the tracks to move the arms 22 to the stowed orientations, and the fastener is moveable downward along the tracks to bottoms of the tracks to move the arms to the deployed orientations. The head 26 includes opposing side walls 64 extending rearward from the front guide 62 to the rear guide 62. The side walls 64 and lower segments of the guides 62 form the receiver 56 in which the bracket tongues 40A are received in the deployed configuration. When the flag 10 is in the stowed configuration, the tongues 40A are out of the receiver 56, such as shown in FIG. 6.

The left and right braces 58 are configured for bracing the respective left and right wing brackets 40 in the stowed and deployed orientations. Referring to FIG. 8, the braces 58 each include a set of walls including front, rear, and bottom walls 58A-58C arranged to brace or form an interference fit with the tongues 40A of the brackets 40 in the stowed configuration and to brace the rod connectors 40B of the brackets in the deployed configurations.

The head 26 includes left and right fulcrums or cams 66 at the mouth of the receiver 56. As explained in further detail below, the cams 66 assist in guiding the tongues 40A of the brackets 40 into the receiver 56, and facilitate changing the orientations of the wing arms 22 from stowed to deployed.

Figure 9:
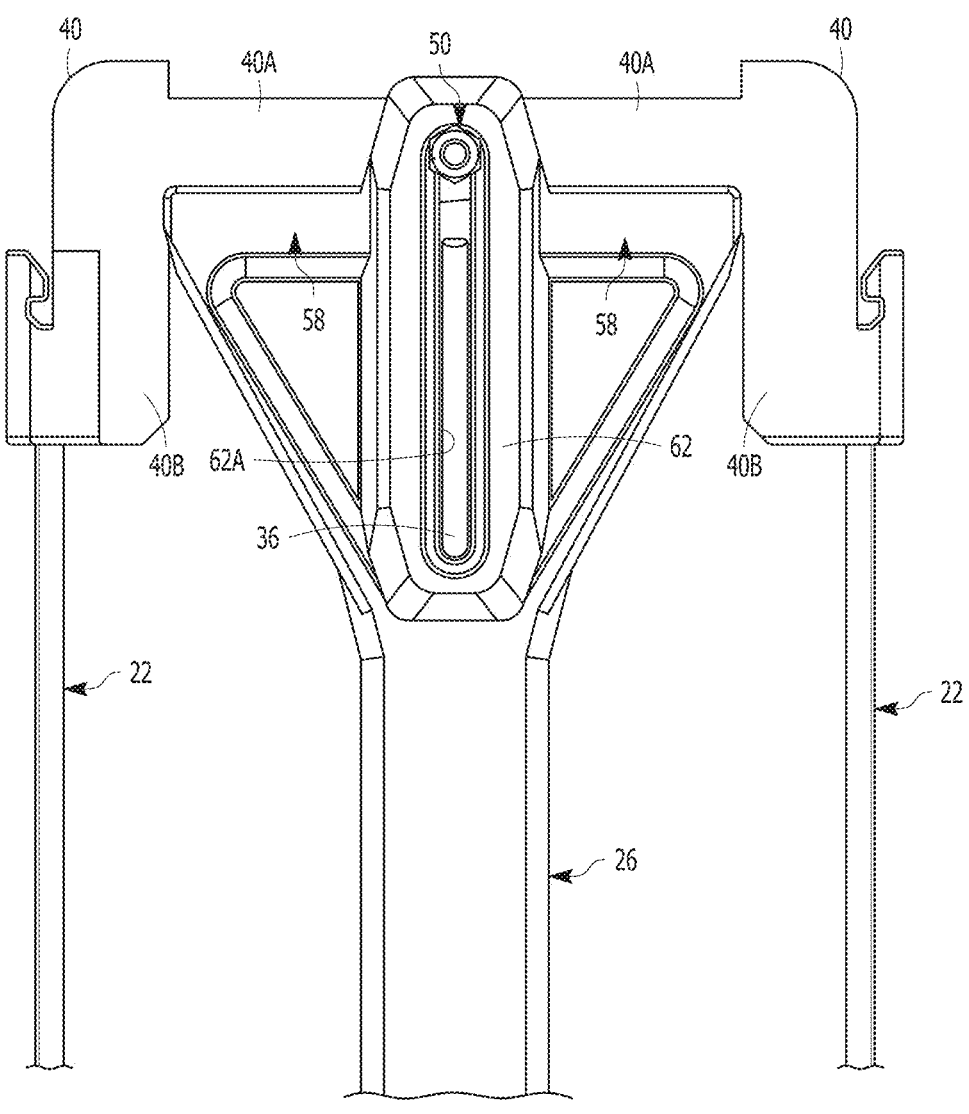
FIG. 9 is a fragmentary front elevation of the head region of the frame in the stowed configuration.
Figure 10:
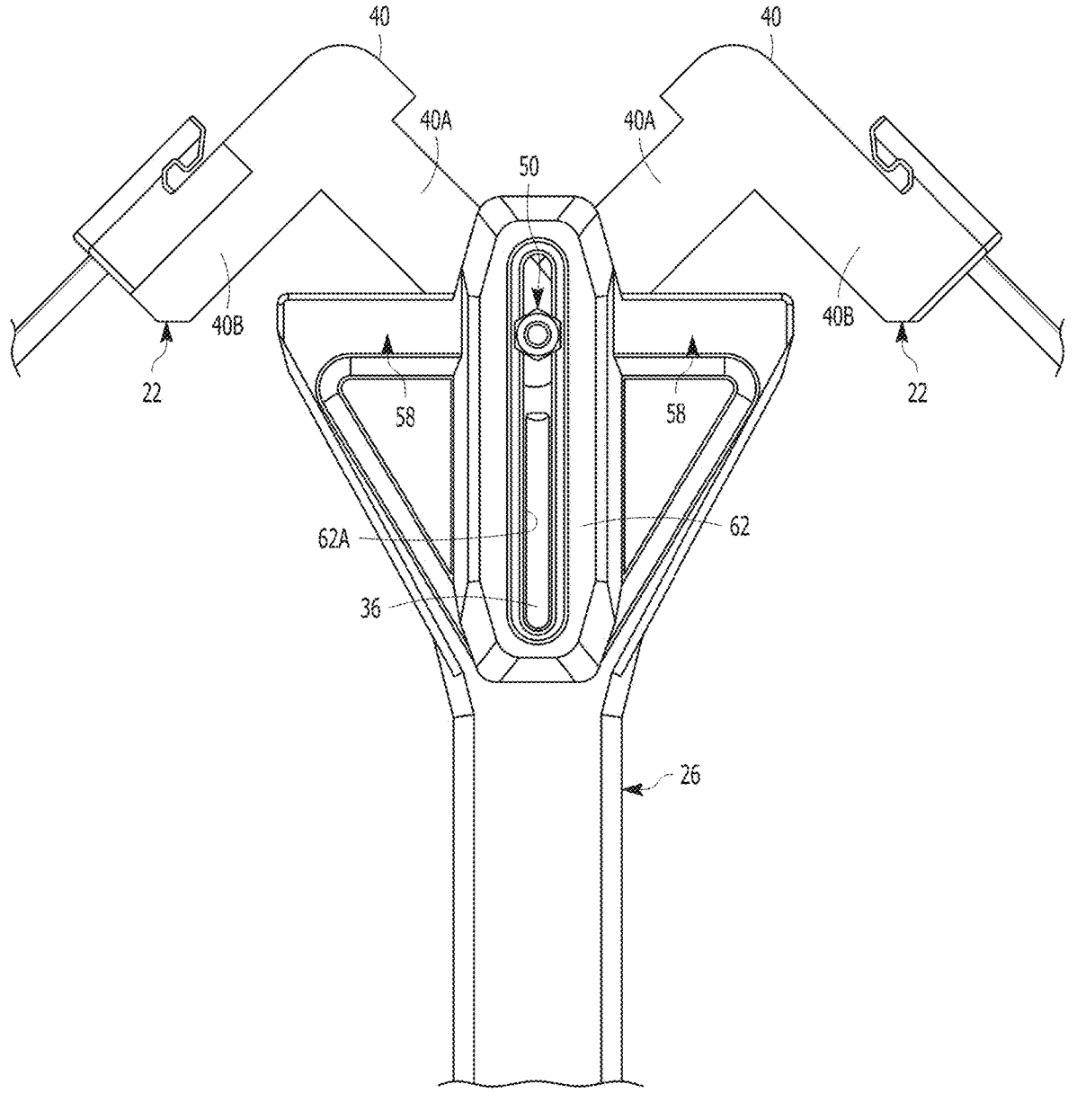
FIG. 10 is a fragmentary front elevation of the head region of the frame in a partially deployed configuration.
Figure 11:
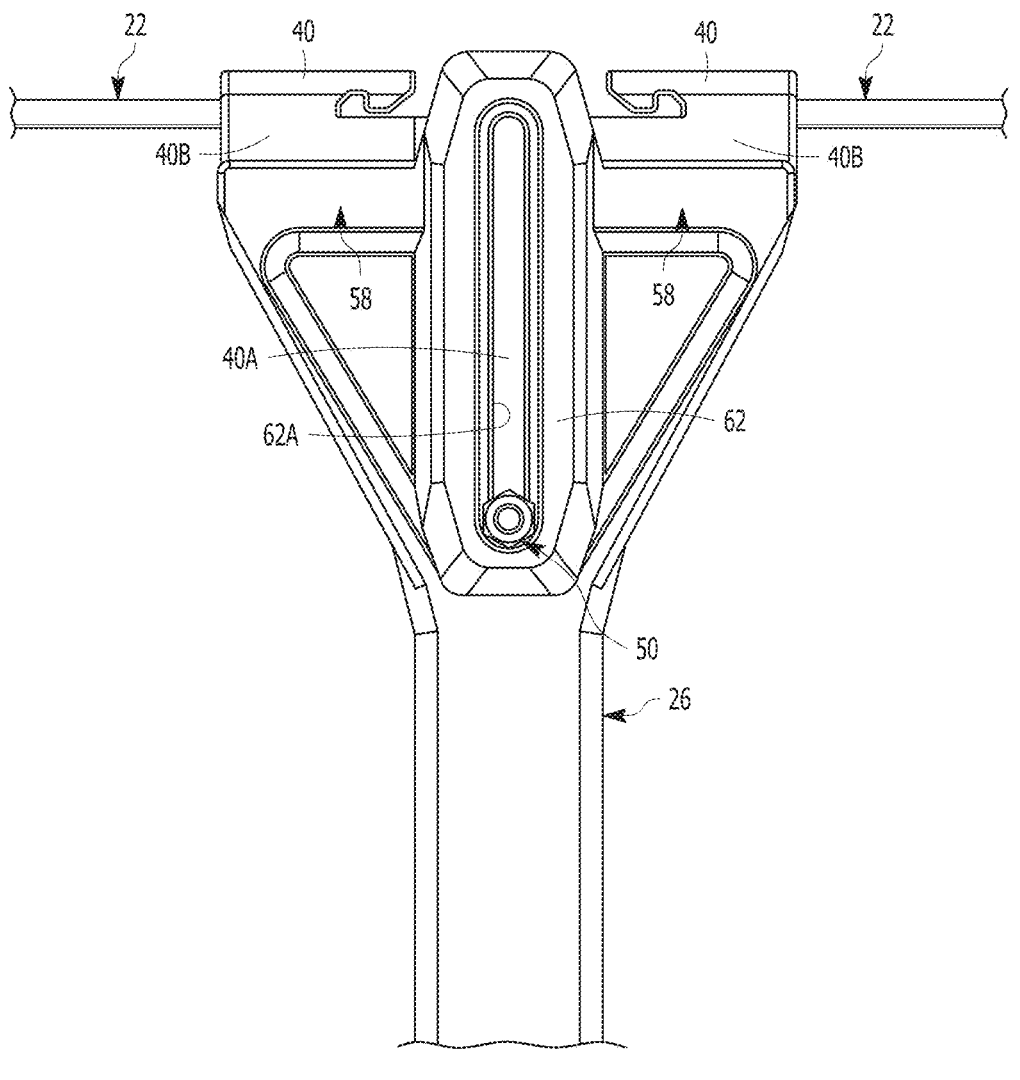
FIG. 11 is a fragmentary front elevation of the head region of the frame in the deployed configuration.

As shown in sequence in FIGS. 9-11, the wing arms 22 are moved from the stowed orientations to the deployed orientations by moving the pivot connection downward in the guides 62 by downward movement of the wing actuator 32. When the pivot connection is at the top of the guide 62 (FIG. 9), the wing rods 42 of the wing arms 22 extend downward generally parallel with the shaft 24 of the wing support 20. The tops of the guides 62 act as keepers in retaining the pivot connection in position in the stowed configuration. FIG. 10 shows an intermediate position in which the wing actuator 32 has been pulled partially downward. The tongues 40A of the two brackets 40 act as cam followers in engaging the cams 66 of the head 26 and guide the tongues down into the receiver 56. Such engagement of the tongues 40A with the cams 66 and downward movement of the pivot connection causes the wing arms 22 to transition toward the deployed orientations. When the pivot connection has been moved fully downward by the wing actuator 32, as shown in FIG. 11, the tongues 40A are fully received in the receiver 56 such that the rod connectors 40B of the brackets 40 are received by the braces 58 in the deployed configuration. The receiver 56 and braces 58 are configured to conform to the shape and size of the brackets 40 to provide a conforming nesting of the brackets in the receiver and braces. The walls of the braces 58 are located to engage the rod connectors 40B to prevent forward, rearward, and downward movement of the rod connectors. Moreover, the tongues 40A engage the inside surfaces of the receiver 56 to further brace the wing arms 22. The arrangement is such that the wing arms 22 are prevented from pivoting about the pivot connection in the deployed configuration. The configuration provides a robust, durable construction enabling convenient and effective operation.

To return the wing arms 22 to the stowed configuration from the deployed configuration, the process is reversed, by the user applying upward movement to the wing actuator 32. As the pivot connection moves upward (e.g., FIG. 10), the wing arms 22 begin to pivot toward the stowed orientations. Eventually, the pivot connection moves fully upward, and the wing arms are in the stowed orientations (e.g., FIG. 9).

Figure 12:
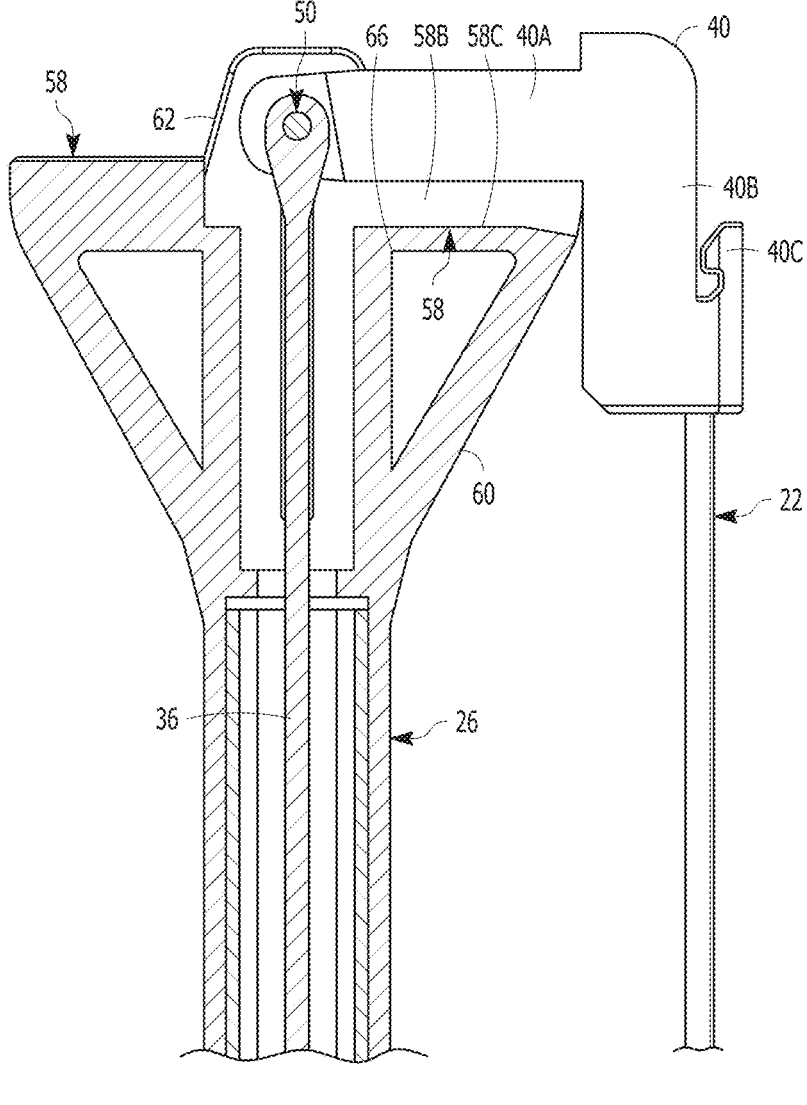
FIG. 12 is a fragmentary section of the head region of the frame in the stowed configuration taken in the plane 12-12 of FIG. 6.
Figure 13:
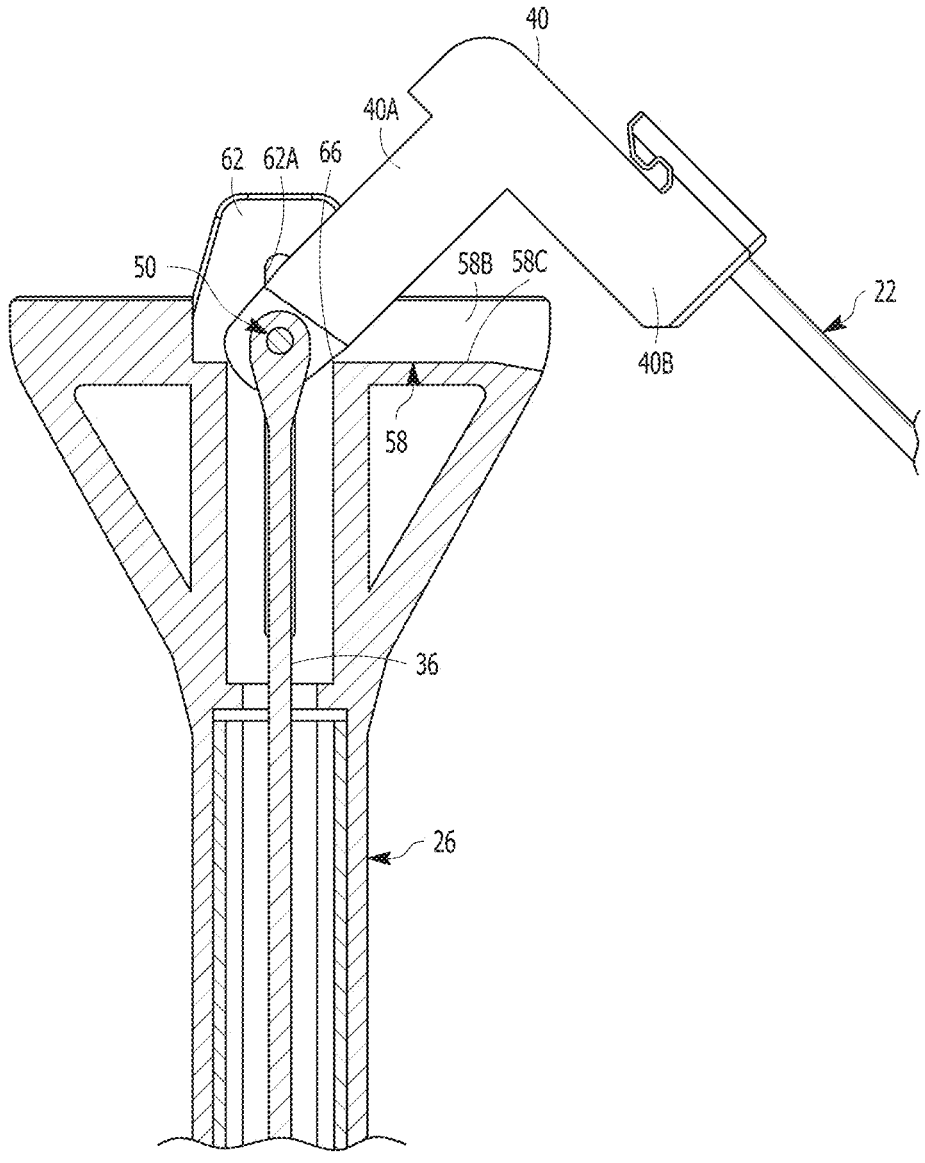
FIG. 13 is a fragmentary section similar to FIG. 12 but showing the head region in the partially deployed configuration.
Figure 14:
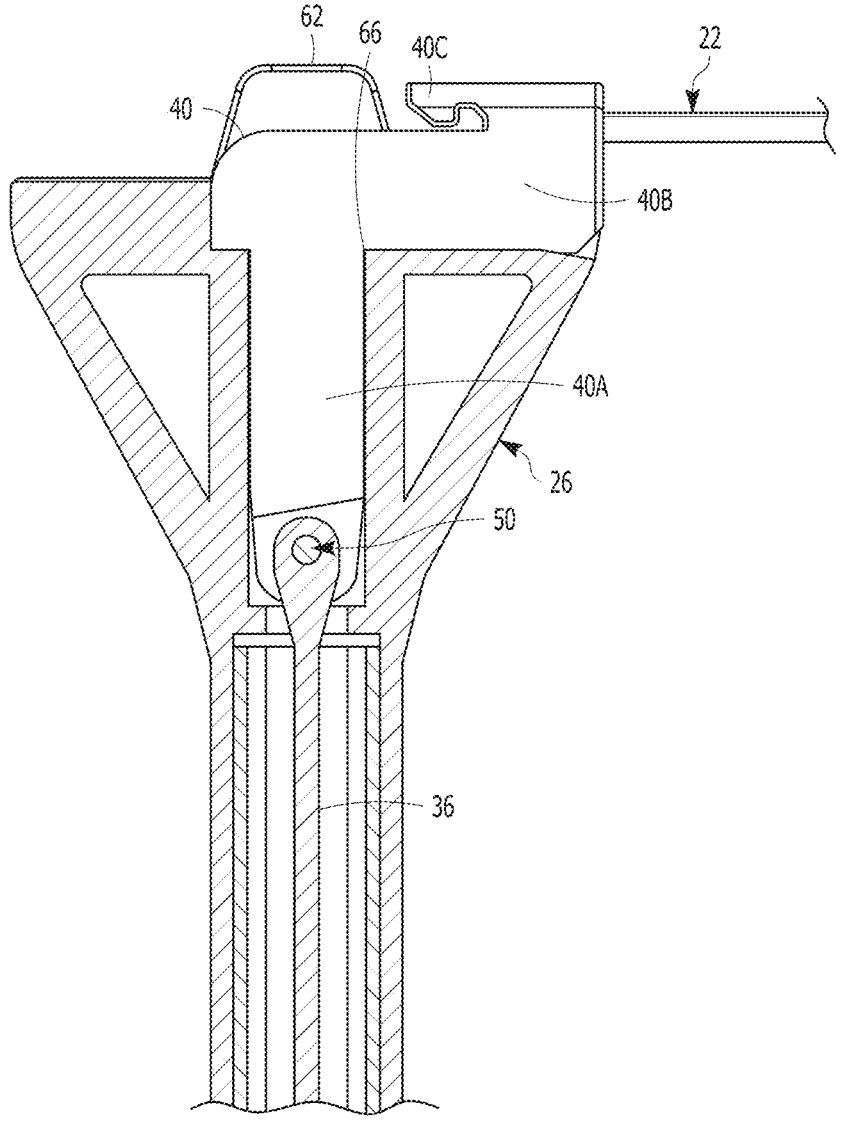
FIG. 14 is a fragmentary section similar to FIG. 12 but showing the head region in the deployed configuration.

FIGS. 12-14 illustrate a similar sequence as FIGS. 9-11 but show the flag 10 in cross section. The section is taken between (front-to-rear) the two wing arms 22 such that the right wing arm is shown but not the left wing arm. In FIG. 12, the bracket 40 of the right wing arm 22 is shown received in the brace 58. In FIG. 13, the bracket 40 of the right wing arm 22 is shown engaging the cam 66 to pivot the wing arm. Finally, in FIG. 14, the tongue 40A of the right bracket 40 is shown in the receiver 56, and the rod connector 40B is in the right brace 58. The arrangement of the left wing 22 arm and its movement with respect to the left brace 58 and the receiver 56 is similar.

Figure 15:
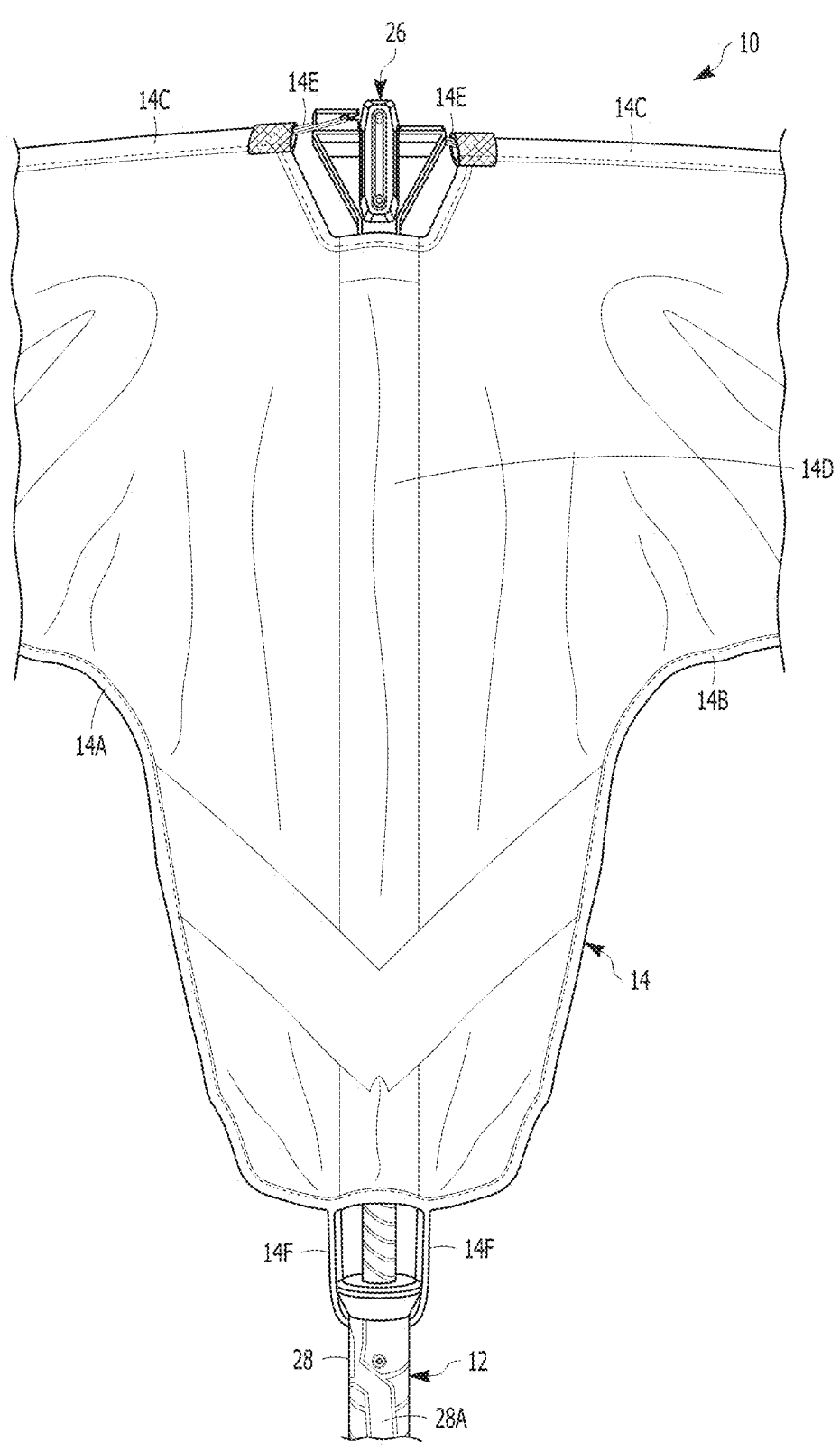
FIG. 15 is a fragmentary front elevation of the waterfowl flag in the deployed configuration.
Figure 16:
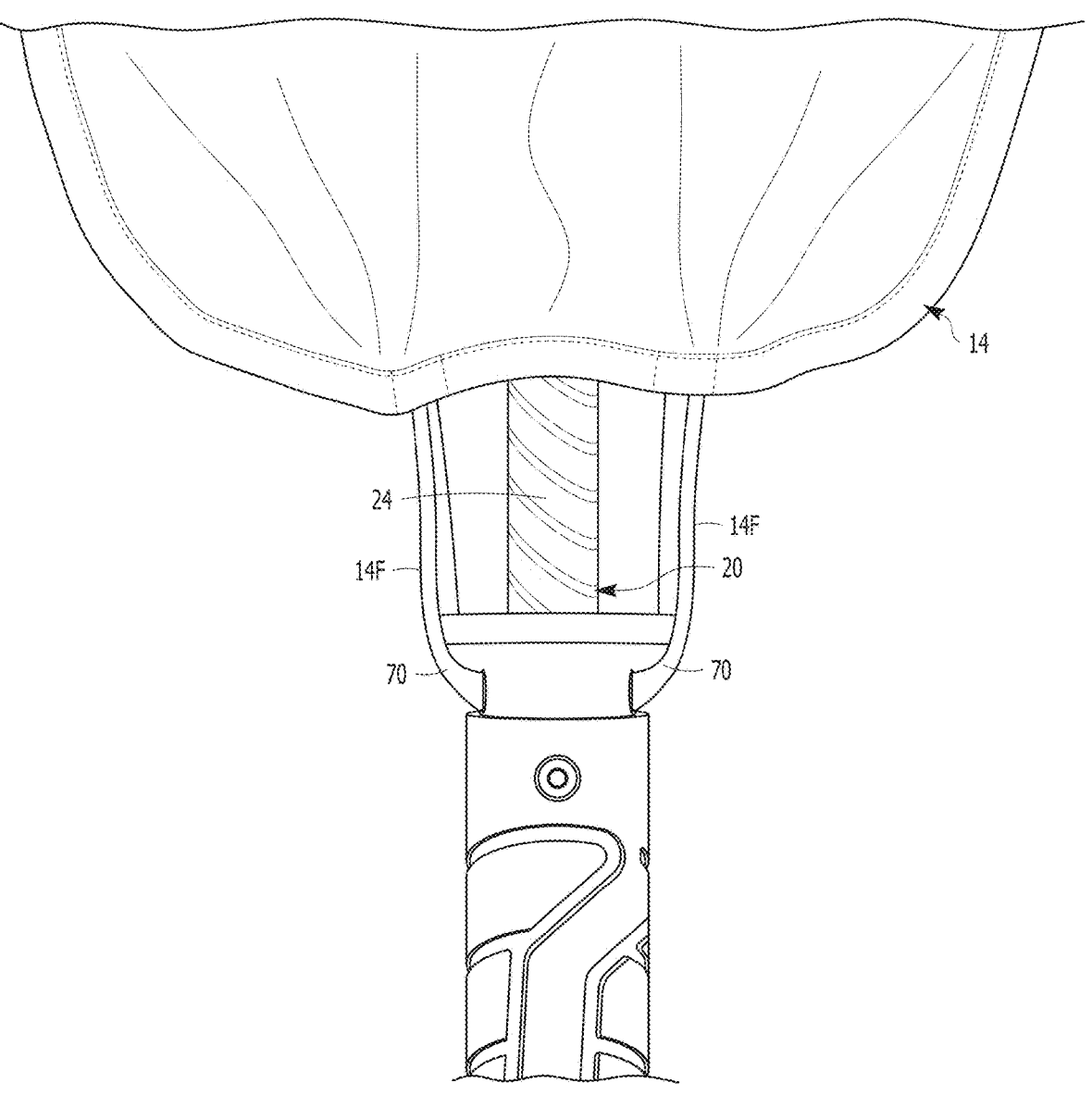
FIG. 16 is a fragmentary front elevation of the waterfowl flag in the deployed configuration.

As shown in FIGS. 15 and 16, the static handle grip 28A includes left and right tie connectors 70 in the form of clips or hooks over which the lower ties 14F are received. The ties 14F are configured to retain the lower portion of the webbing 14 on the frame 12. The ties 14F are also configured to assist in maintaining the wings in the deployed orientations and for contributing to an "over center" arrangement. Desirably, when the wings are in the deployed orientations, the ties 14F are tensioned to provide a retaining force acting through tension in the left and right wing webbing portions 14A, 14B to tend to pull the pivot connection of the two brackets 40 downward, retaining the pivot connection at the bottom of the receiver 56 (e.g., the fastener 50 at the bottom of the two guides 62). Accordingly, the tension in the ties 14F tends to maintain the flag 10 in the deployed configuration. To change the flag to the stowed configuration, the user needs to apply sufficient force to the wing actuator 32 to cause the ties 14F to extend more to permit the arm brackets to pass "over center" with respect to the cams 66. The brackets 40 and cams 66 are arranged to provide an over center configuration. The lower ties 14F apply tension via the left and right wing webbing portions 14A, 14B to the wing rods 42 and brackets 40. When the pivot connection is relatively low in the receiver 56, and the brackets 40 have not pivoted sufficiently over the cams 66, the tension on the wing rods 42 causes the pivot connection to tend to stay in the receiver. However, after the pivot connection is moved sufficiently upward, and the arm brackets 40 have pivoted sufficiently over the cams 66, the tension applied by the left and right wing webbing portions 14A, 14B to the wing arms 22 begins biasing the arms toward the stowed orientations. In the stowed configuration, the lower ties 14F may be partially tensioned or may be untensioned. In reversing the process to change back to the deployed configuration, as the user begins pulling the wing actuator 32 downward, the lower ties 14F will bias the wing arms 22 toward the stowed positions until the brackets 40 pass over center with respect to the cams 66, at which point the lower ties will bias the pivot connection down into the receiver 56 and assist in retaining the arms in the deployed orientations. It will be appreciated that the maximum extension of the lower ties 14F is when the brackets 40 are passing over center with respect to the cams 66.

Figure 17:
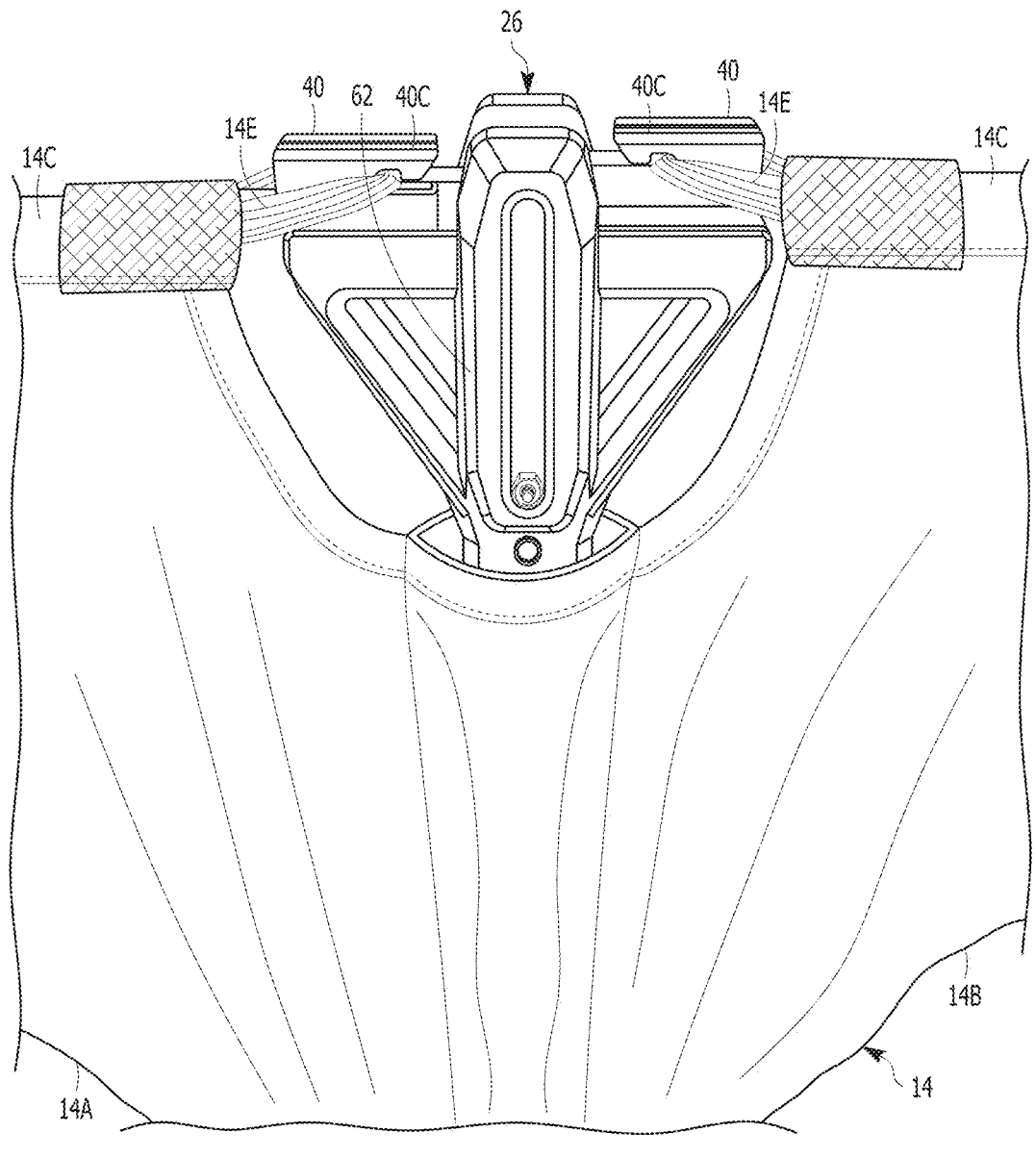
FIG. 17 is a top perspective of the waterfowl flag in the deployed configuration.
Figure 18:
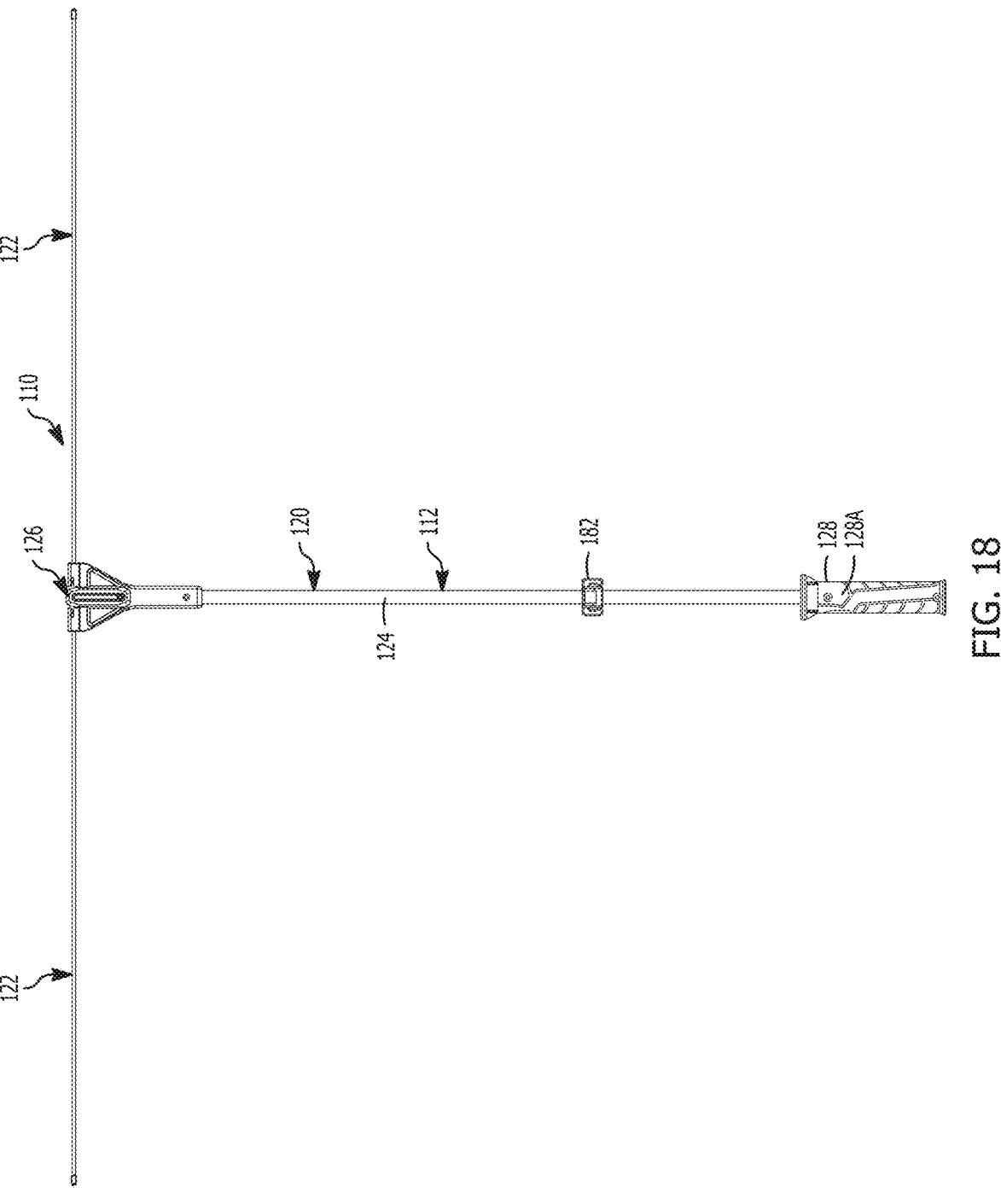
FIG. 18 is a front elevation of a second embodiment of a frame of a waterfowl flag of the present disclosure shown in a deployed configuration.
Figure 19:
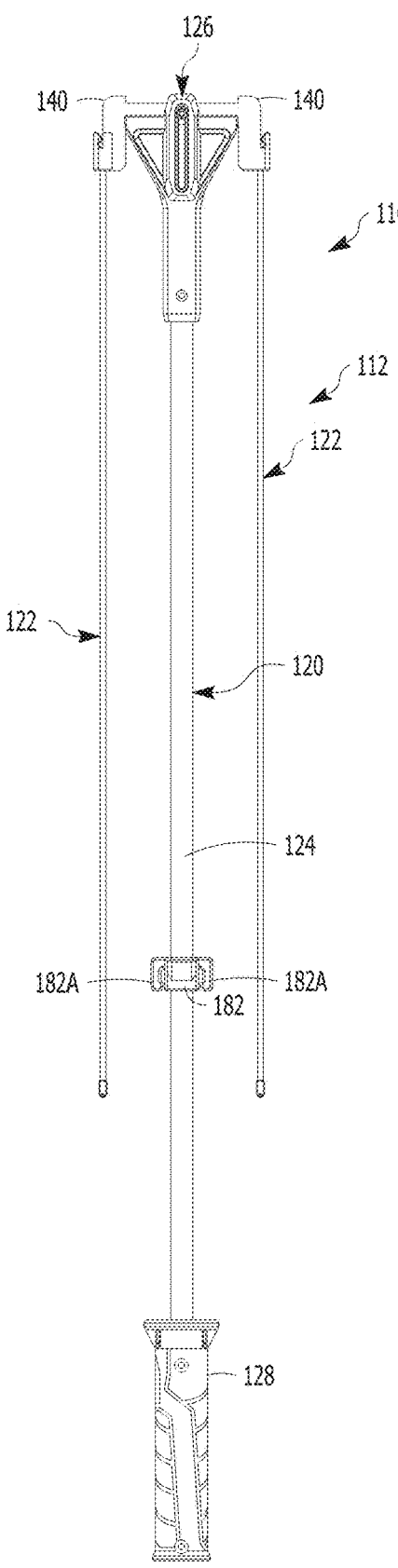
FIG. 19 is a front elevation of the frame of FIG. 18 shown in a stowed configuration.
Figure 20:
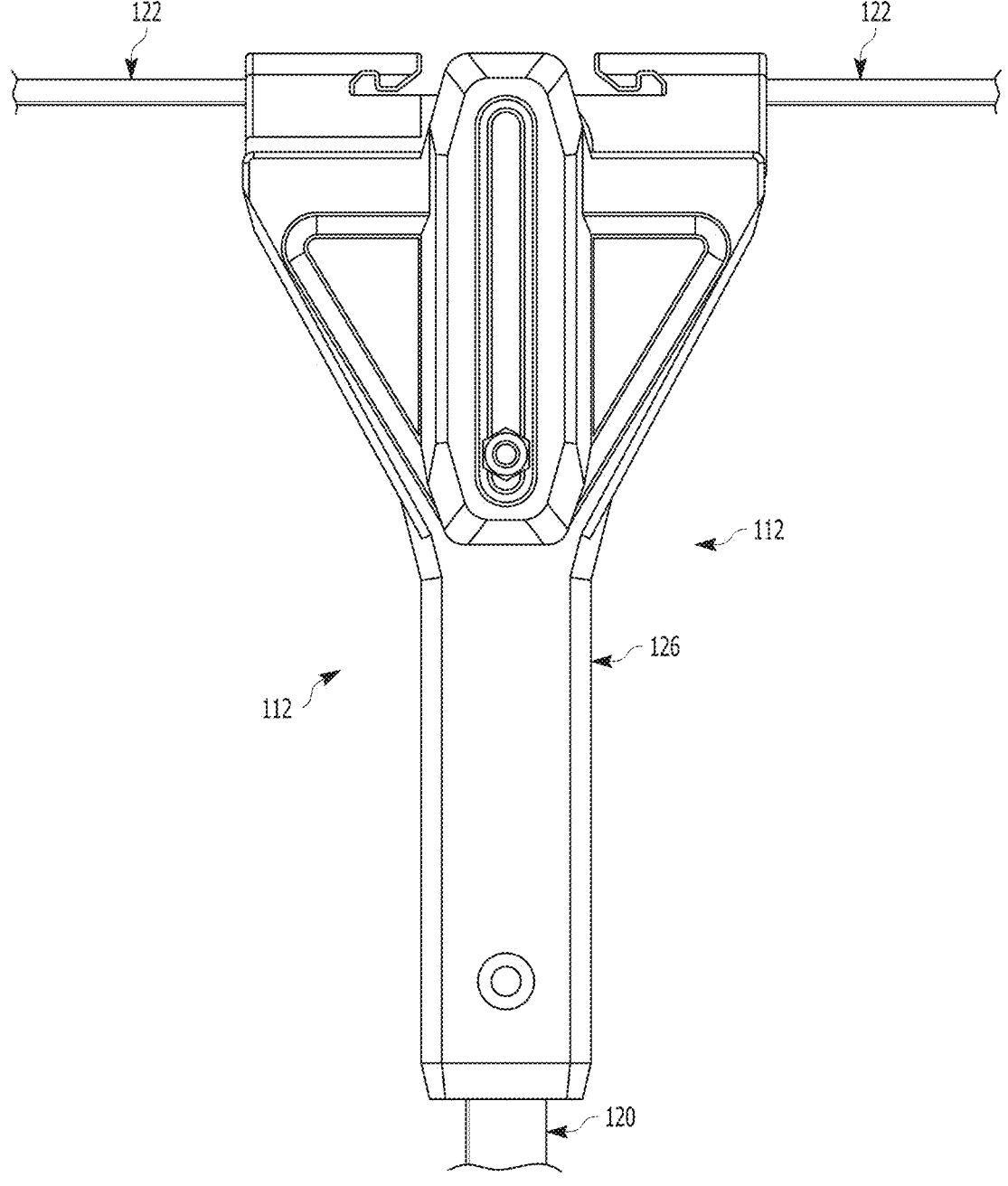
FIG. 20 is a fragmentary front elevation of a head region of the frame in the deployed configuration.
Figure 21:
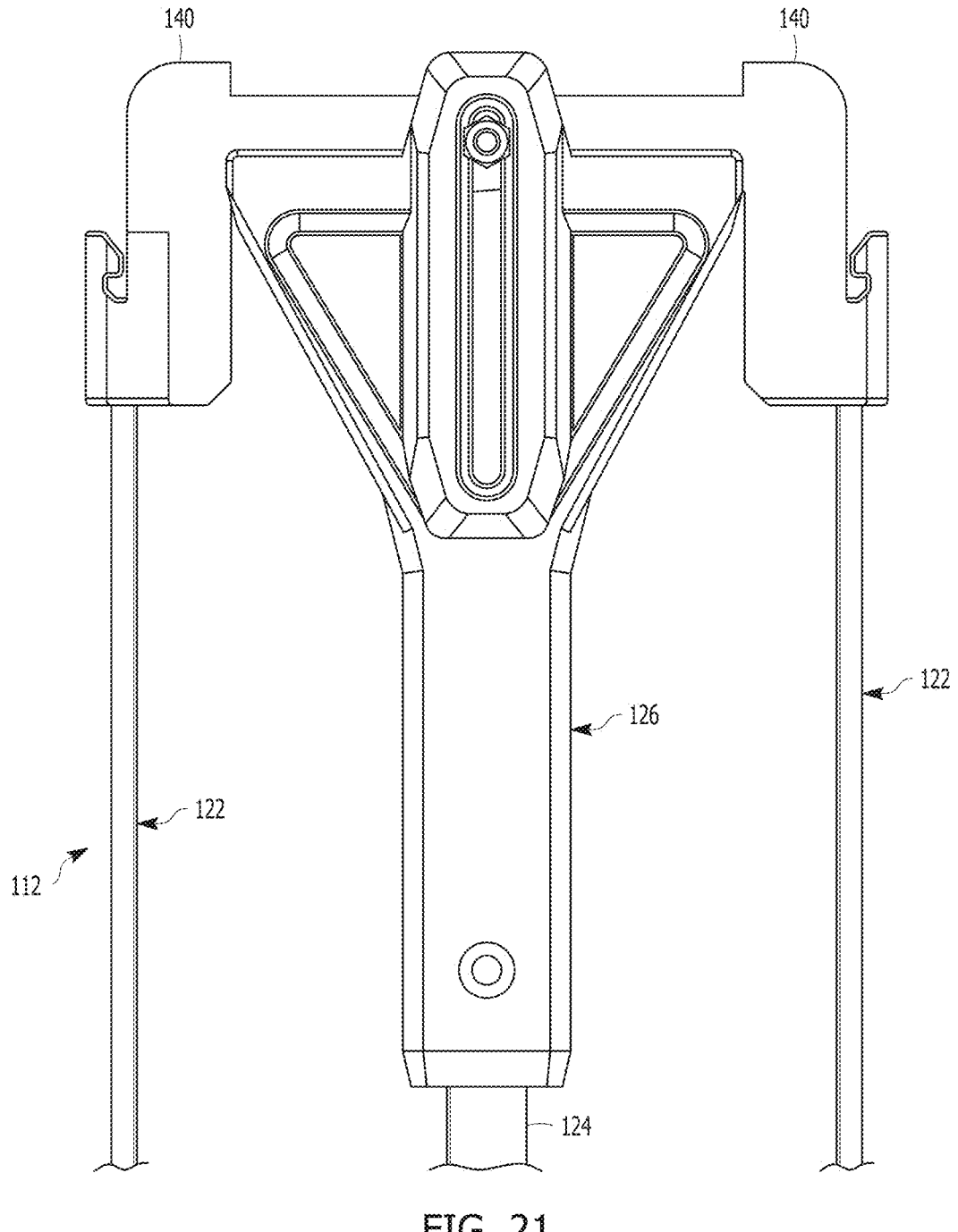
FIG. 21 is a fragmentary front elevation of the head region of the frame in the stowed configuration.
Figure 22:
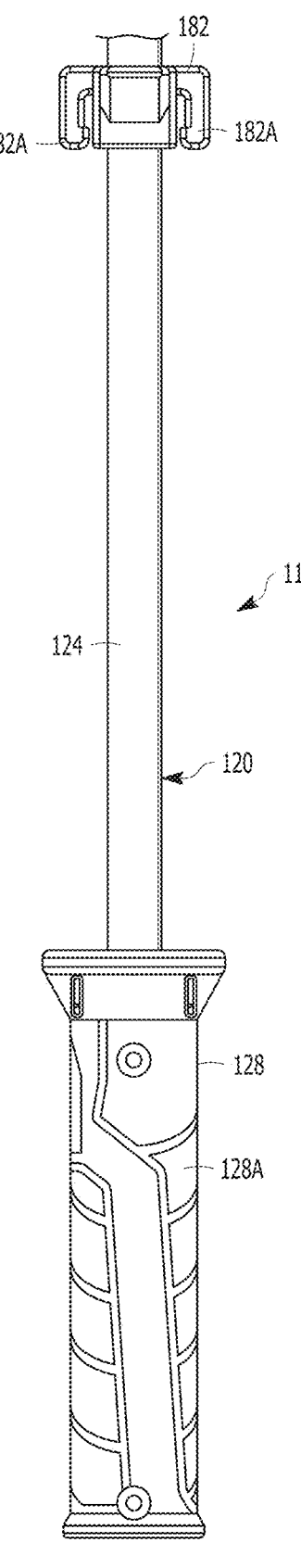
FIG. 22 is a fragmentary front elevation of a handle region of the frame.

As shown in FIG. 17, the left and right wing webbing portions 14A, 14B are retained in position on the left and right wing arms 22 by the upper ties 14E received on the tie connectors 40C (e.g., clips or hooks). To install the left and right wing webbing portions 14A, 14B on the wing arms 22, the distal ends of the wing rods 42 are threaded through the sleeves 14C of the webbing. The distal ends of the rods 42 eventually are located in closed distal ends of the sleeves 14C. The upper ties 14E are then installed in a resiliently tensioned manner to the tie connectors 40C to resist the sleeves 14C from moving distally on the respective rods. The ties 14E bias the left and right wing webbing portions 14A, 14B inboard to keep the distal ends of the wing rods 42 in the closed distal ends of the sleeves 14C and permit flexing of the wing rods and webbing 14 to provide a realistic wing flapping motion.

A second embodiment of a waterfowl decoy flag 110 of the present disclosure will now be described with respect to FIGS. 18-22. The waterfowl decoy flag 110 is substantially the same as the decoy flag described above with respect to FIGS. 1-17, and like parts are indicated with like reference numbers, plus 100. For example, the waterfowl decoy flag 110 includes a frame 112 having a wing support 120 and left and right wing arms 122. No webbing is shown on the frame, but it will be appreciated that the same webbing 14 disclosed above can be used on this frame to form the decoy flag 110. The frame 112 here is different in part in that the shaft 124 is circular in cross-sectional shape and tapers in width from the handle end portion to the head end portion. The head end portion has a smaller width than the handle end portion. The shaft 124 may be made of flexible fiberglass and desirably is configured to be significantly flexible without breaking. The flexing of the shaft 124 enhances the wing flapping motion to decoy waterfowl. The head 126 of the wing support 120 has the same construction as above, as do the wing arms 122. However, in this embodiment, no wing driver is provided, but a wing driver could be provided without departing from the scope of the present disclosure. There is a single static handle 128 with grip 128A at the handle end portion of the shaft 124. The brackets 140 of the wing arms 122 are connected by the same pivot connection as described above, and the wings are moved between the stowed and deployed orientations by the user gripping one or both wings (e.g., one of the wing brackets 140) and manipulating the wing to cause the wing to move to the desired orientation. Because of the pivot connection between the wing arms 122, the wings move together between the stowed and operational orientations even if the user manipulates one of the wings by hand. A fitting 182 including two tie connectors 182A (e.g., clips or hooks) is provided on the shaft 124 at the handle end portion for connection of the lower ties 14F of the webbing 14. The lower ties 14F function in the same way as described above. Moreover, the wing arms 122 are moveable over center with respect to the head 126 in the same way as described above. In effect, the waterfowl decoy flag 110 functions in the same way as the flag 10 described above except the user engages a wing arm 122 by hand to move the wings between the stowed and operational orientations, and the spine shaft 124 is flexible to permit more flexing when the user is waving or otherwise moving the decoy flag to attract attention of waterfowl.

It is appreciated that the person of ordinary skill in the art is readily able to determine the scope of terms of degree such as, but not limited to, "about," "substantially," and "generally." For example, when a term of degree is used in relation to a numeric value, the person of ordinary skill in the art understands that the term of degree covers an inclusive range of plus or minus 10% of the numeric value, unless clearly indicated or stated otherwise.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

Modifications and variations of the disclosed embodiments are possible without departing from the scope of the invention defined in the appended claims. For example, where specific dimensions are given, it will be understood that they are exemplary only and other dimensions are possible. As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A waterfowl decoy flag comprising:

a wing arm support;

a first wing arm;

a second wing arm;

a first wing webbing portion associated with the first wing arm;

a second wing webbing portion associated with the second wing arm;

the first and second wing arms being selectively configurable with respect to the wing arm support in a stowed configuration and in a deployed configuration, the first and second wing arms when in the deployed configuration:

being supported by the wing arm support, being in respective deployed orientations with respect to the wing arm support, and supporting the respective first and second wing webbing portions to form first and second wings, and the first and second wing arms when in the stowed configuration:

being in respective stowed orientations with respect to the wing arm support different from the deployed orientations wherein the first wing arm is connected to the wing arm support by a pivot connection, the first wing arm being configured to pivot with respect to the wing arm support about the pivot connection to stow and deploy the first wing arm, wherein in the deployed configuration the pivot connection is located in a first position with respect to the wing arm support, and in the stowed configuration the pivot connection is located in a second position with respect to the wing arm support different from the first position.

2. A waterfowl decoy flag as set forth in claim 1, further comprising a wing arm driver including a wing arm actuator, the wing arm actuator being moveable with respect to the first wing arm and being operatively coupled to the first wing arm to drive the first wing arm to at least one of move away from the stowed orientation toward the deployed orientation or move away from the deployed orientation toward the stowed orientation.

3. A waterfowl decoy flag as set forth in claim 2, wherein the wing arm actuator is operatively coupled to the first wing arm to, responsive to movement of the wing arm actuator, drive the first wing arm to move away from the stowed orientation toward the deployed orientation and to move away from the deployed orientation toward the stowed orientation.

4. A waterfowl decoy flag as set forth in claim 3, wherein the wing arm actuator is operatively coupled to the second wing arm to, responsive to movement of the wing arm actuator, drive the second wing arm to move away from the stowed orientation toward the deployed orientation and to move away from the deployed orientation toward the stowed orientation.

5. A waterfowl decoy flag as set forth in claim 2, wherein the wing arm actuator is moveable with respect to the second wing arm and is operatively coupled to the first wing arm to drive the first wing arm to at least one of move away from the stowed orientation toward the deployed orientation or move away from the deployed orientation toward the stowed orientation.

6. A waterfowl decoy flag as set forth in claim 2, wherein the wing arm support comprises a shaft, the wing arm actuator being supported by the shaft and moveable with respect to the shaft.

7. A waterfowl decoy flag as set forth in claim 6, wherein the shaft has a head end portion and a handle end portion, the wing arm actuator being located at the handle end portion.

8. A waterfowl decoy flag as set forth in claim 7, wherein the wing arm support comprises a first handle grip, the wing arm actuator comprising a slider that is slideable along the shaft with respect to the first handle grip to drive movement of the first wing arm between the stowed and deployed orientations.

9. A waterfowl decoy flag as set forth in claim 8, wherein the slider comprises a second handle grip.

10. A waterfowl decoy flag as set forth in claim 7, wherein the wing arm driver comprises a linkage operatively coupling the first wing arm to the wing arm actuator to drive movement of the first wing arm responsive to movement of the wing arm actuator.

11. A waterfowl decoy flag as set forth in claim 10, wherein the linkage comprises a rod extending along the shaft.

12. A waterfowl decoy flag as set forth in claim 11, wherein the rod extends inside the shaft.

13. A waterfowl decoy flag as set forth in claim 1, wherein the first wing arm comprises a wing rod having a longitudinal axis, the pivot connection being offset with respect to the longitudinal axis of the wing rod.

14. A waterfowl decoy flag as set forth in claim 1, wherein the first and second wing arms are moveably connected to the wing arm support and moveable with respect to the wing arm support between the stowed and deployed orientations, the first and second wing arms being operatively connected to cause movement of the first and second wing arms together between the stowed and deployed orientations.

15. A waterfowl decoy flag as set forth in claim 1, wherein the pivot connection defines a pivot axis, wherein the first wing arm is pivotable about the pivot axis with respect to the wing arm support to stow and deploy the first wing arm, and the second wing arm is pivotable about the pivot axis with respect to the wing arm support to stow and deploy the first wing arm.

16. A waterfowl decoy flag as set forth in claim 1, wherein the first wing arm is moveably connected to the wing arm support to be moveable with respect to the wing arm support between the stowed and deployed orientations without disconnecting the first wing arm from the wing arm support, the wing arm support including a tongue receiver, the first wing arm including a tongue moveable with respect to the tongue receiver, in the deployed configuration the tongue being located in the tongue receiver, and in the stowed configuration the tongue being out of the tongue receiver.

17. A waterfowl decoy flag as set forth in claim 1, wherein the first wing arm is connected to the wing arm support to provide an over-center arrangement requiring the first wing arm to move over center to overcome a bias of the first wing arm toward the deployed orientation before moving to the stowed orientation.

18. A waterfowl decoy flag as set forth in claim 17, wherein the first wing webbing portion is configured to be tensioned to apply said bias of the first wing arm toward the deployed orientation.

19. A waterfowl decoy flag as set forth in claim 18, wherein the first wing webbing portion comprises a resiliently extendable tie configured to be extended to apply said bias of the first wing arm toward the deployed orientation.

20. A waterfowl decoy flag as set forth in claim 1, wherein the first wing webbing portion is configured to be tensioned in the deployed configuration to apply retaining force to at least one of the first wing arm to retain the first wing arm in the deployed orientation.

21. A waterfowl decoy flag as set forth in claim 20, wherein the first wing webbing portion comprises a resiliently extendable tie configured to be extended to apply said retaining force to the first wing arm.

22. A waterfowl decoy flag as set forth in claim 20, wherein the wing arm support includes a receiver, the first wing arm being moveable into the receiver to orient the first wing arm in the deployed orientation, the first wing webbing portion being configured to be tensioned in the deployed configuration to apply said retaining force to the first wing arm to retain the wing arm in the receiver.

23. A waterfowl decoy flag as set forth in claim 1, wherein the first and second wing arms are connected by the pivot connection about which the first and second wing arms are pivotable between the stowed and deployed orientations, the wing arm support defining a receiver in which the pivot connection is selectively receivable to move the first and second wing arms to the deployed orientations.

24. A waterfowl decoy flag as set forth in claim 23, wherein at least one of the first or second webbing portions is configured to be tensioned in the deployed configuration to apply retaining force to at least one of the first wing arm or the second wing arm to retain the pivot connection in the receiver to retain the first and second wing arms in the deployed orientations.

25. A waterfowl decoy flag as set forth in claim 1, wherein the first wing arm comprises a first wing rod and the second wing arm comprises a second wing rod, the first and second wing rods being tapered and including respective proximal and distal end segments, the distal end segments being narrower than the respective proximal end segments, the first and second wing rods in the deployed configuration extending away from the wing support to the distal end segments.

26. A waterfowl decoy flag comprising:

a wing arm support;

a first wing arm;

a second wing arm;

a first wing webbing portion associated with the first wing arm;

a second wing webbing portion associated with the second wing arm;

the first and second wing arms being configured to be supported by the wing arm support in a deployed configuration in which the first and second wing arms are in deployed orientations with respect to the wing arm support and support the respective first and second wing webbing portions to form first and second wings, the first and second wing arms being moveable with respect to the wing arm support to move the first and second wing arms out of the deployed orientations;

wherein at least one of the first or second wing webbing portions is configured to be tensioned in the deployed configuration to apply a retaining force to at least one of the first and second wing arms to retain said at least one of the first and second wing arms in the deployed orientation.

27. A waterfowl decoy flag as set forth in claim 26, wherein the at least one of the first or second wing webbing portions comprises a resiliently extendable tie configured to be tensioned in the deployed configuration to apply said retaining force.

28. A waterfowl decoy flag as set forth in claim 26, wherein the wing arm support comprises a tie connector, the resiliently extendable tie being connected to the tie connector in the deployed configuration.

29. A waterfowl decoy flag comprising:

a wing support having proximal and distal end portions;

a first wing moveably coupled to the wing support at the distal end portion thereof;

a second wing moveably coupled to the wing support at the distal end portion thereof;

a webbing coupled to the first wing and the second wing;

a wing driver operatively coupled to the first and second wings, the wing driver including a wing actuator moveable with respect to the wing support and configured to move the first and second wings between stowed and deployed orientations with respect to the wing support, the wing actuator being disposed proximal of the webbing when the wings are in the deployed orientations.

30. A waterfowl decoy flag as set forth in claim 29, wherein the wing support comprises a shaft and a first handle grip, the wing actuator being supported by and moveable along the shaft with respect to the first handle grip to drive the first and second wings to at least one of move away from the stowed orientation toward the deployed orientation or move away from the deployed orientation toward the stowed orientation.

31. A waterfowl decoy flag as set forth in claim 26, wherein the wing arm support includes a receiver, the first wing arm being moveable into the receiver to orient the first wing arm in the deployed orientation, the first wing webbing portion being configured to be tensioned in the deployed configuration to apply said retaining force to the first wing arm to retain the wing arm in the receiver.

32. A waterfowl decoy flag as set forth in claim 29, wherein the wing actuator comprises a second handle grip.

33. A waterfowl decoy flag as set forth in claim 29, wherein the wing support comprises a shaft and a first handle grip, the wing actuator comprising a second handle grip supported by and moveable along the shaft with respect to the first handle grip to drive the first and second wings to move away from the stowed orientation toward the deployed orientation and to move away from the deployed orientation toward the stowed orientation.

34. A waterfowl decoy flag as set forth in claim 29, wherein the wing support comprises a shaft, and the wing driver comprises a linkage, the linkage operatively coupling the wing actuator to the first and second wings, the linkage extending along the shaft.

35. A waterfowl decoy flag as set forth in claim 34, wherein the linkage comprises a rod extending inside the shaft.

36. A waterfowl decoy flag as set forth in claim 34, wherein the wing actuator comprises a handle grip moveable along the shaft to drive movement of the rod to drive movement of the first and second wings between the stowed and deployed orientations.

37. A waterfowl decoy flag as set forth in claim 29, wherein the wing actuator is disposed proximal of the webbing while the wings are at the stowed orientation.

38. A waterfowl decoy flag as set forth in claim 30, wherein the wing actuator is proximal of the first handle grip while the wings are at the stowed orientation.

39. A waterfowl decoy flag as set forth in claim 30, wherein the wing actuator is proximal of the first handle grip while the wings are at the deployed orientation.

40. A waterfowl decoy flag comprising:
a wing arm support;
a first wing arm;
a second wing arm;
a first wing webbing portion associated with the first wing arm;
a second wing webbing portion associated with the second wing arm;
the first and second wing arms being selectively configurable with respect to the wing arm support in a stowed configuration and in a deployed configuration, the first and second wing arms when in the deployed configuration:
being supported by the wing arm support, being in respective deployed orientations with respect to the wing arm support, and
supporting the respective first and second wing webbing portions to form first and second wings,
and the first and second wing arms when in the stowed configuration:
being in respective stowed orientations with respect to the wing arm support different from the deployed orientations
wherein the first wing arm comprises a wing rod having a longitudinal axis, the wing rod being pivotable about a pivot connection to stow and deploy the first wing arm, the pivot connection being offset with respect to the longitudinal axis of the wing rod.

41. A waterfowl decoy flag as set forth in claim 40, further comprising a wing arm driver including a wing arm actuator, the wing arm actuator being moveable with respect to the first wing arm and being operatively coupled to the first wing arm to drive the first wing arm to at least one of move away from the stowed orientation toward the deployed orientation or move away from the deployed orientation toward the stowed orientation.

42. A waterfowl decoy flag as set forth in claim 41, wherein the wing arm actuator is moveable with respect to the second wing arm and is operatively coupled to the second wing arm to drive the second wing arm to at least one of move away from the stowed orientation toward the deployed orientation or move away from the deployed orientation toward the stowed orientation.

43. A waterfowl decoy flag as set forth in claim 41, wherein the wing arm support comprises a shaft, the wing arm actuator being supported by the shaft and moveable with respect to the shaft.

44. A waterfowl decoy flag as set forth in claim 40, wherein the first wing arm is moveably connected to the wing arm support to be moveable with respect to the wing arm support between the stowed and deployed orientations without disconnecting the first wing arm from the wing arm support, the wing arm support including a tongue receiver, the first wing arm including a tongue moveable with respect to the tongue receiver, in the deployed configuration the tongue being located in the tongue receiver, and in the stowed configuration the tongue being out of the tongue receiver.

45. A waterfowl decoy flag as set forth in claim 40, wherein the first wing webbing portion is configured to be tensioned in the deployed configuration to apply retaining force to at least one of the first wing arm to retain the first wing arm in the deployed orientation.

46. A waterfowl decoy flag comprising:
a wing arm support;
a first wing arm;
a second wing arm;
a first wing webbing portion associated with the first wing arm;
a second wing webbing portion associated with the second wing arm;
the first and second wing arms being selectively configurable with respect to the wing arm support in a stowed configuration and in a deployed configuration, the first and second wing arms when in the deployed configuration:
being supported by the wing arm support,
being in respective deployed orientations with respect to the wing arm support, and
supporting the respective first and second wing webbing portions to form first and second wings, and the first and second wing arms when in the stowed configuration:

being in respective stowed orientations with respect to the wing arm support different from the deployed orientations; and wherein the first wing arm is connected to the wing arm support to provide an over-center arrangement requiring the first wing arm to move over center to overcome a bias of the first wing arm toward the deployed orientation before moving to the stowed orientation.

47. A waterfowl decoy flag as set forth in claim 46, wherein the first wing webbing portion is configured to be tensioned to apply said bias of the first wing arm toward the deployed orientation.

48. A waterfowl decoy flag as set forth in claim 47, wherein the first wing webbing portion comprises a resiliently extendable tie configured to be extended to apply said bias of the first wing arm toward the deployed orientation.

49. A waterfowl decoy flag as set forth in claim 46, wherein the first and second wing arms are connected by a pivot connection about which the first and second wing arms are pivotable between the stowed and deployed orientations, the wing arm support defining a receiver in which the pivot connection is selectively receivable to move the first and second wing arms to the deployed orientations.

50. A waterfowl decoy flag as set forth in claim 49, wherein at least one of the first or second webbing portions is configured to be tensioned in the deployed configuration to apply retaining force to at least one of the first wing arm or the second wing arm to retain the pivot connection in the receiver to retain the first and second wing arms in the deployed orientations.

51. A waterfowl decoy flag as set forth in claim 46, further comprising a wing arm driver including a wing arm actuator, the wing arm actuator being moveable with respect to the first wing arm and being operatively coupled to the first wing arm to drive the first wing arm to at least one of move away from the stowed orientation toward the deployed orientation or move away from the deployed orientation toward the stowed orientation.

52. A waterfowl decoy flag comprising:

a wing support;

a first wing moveably coupled to the wing support;

a second wing moveably coupled to the wing support;

a wing driver operatively coupled to the first and second wings, the wing driver including a wing actuator moveable with respect to the wing support and configured to move the first and second wings between stowed and deployed orientations with respect to the wing support;

wherein the wing support comprises a shaft, and the wing driver comprises a linkage, the linkage operatively coupling the wing actuator to the first and second wings, the linkage extending along the shaft; and wherein the linkage comprises a rod extending inside the shaft.

53. A waterfowl decoy flag as set forth in claim 52, wherein the wing support comprises a first handle grip, the wing actuator being supported by and moveable along the shaft with respect to the first handle grip to drive the first and second wings to at least one of move away from the stowed orientation toward the deployed orientation or move away from the deployed orientation toward the stowed orientation.

54. A waterfowl decoy flag as set forth in claim 52, wherein the wing actuator comprises a second handle grip.

55. A waterfowl decoy flag as set forth in claim 52, wherein the wing support comprises a first handle grip, the wing actuator comprising a second handle grip supported by and moveable along the shaft with respect to the first handle grip to drive the first and second wings to move away from the stowed orientation toward the deployed orientation and to move away from the deployed orientation toward the stowed orientation.

56. A waterfowl decoy flag as set forth in claim 52, wherein the wing actuator comprises a handle grip moveable along the shaft to drive movement of the rod to drive movement of the first and second wings between the stowed and deployed orientations.

\* \* \* \* \*